United States Patent
Go et al.

(10) Patent No.: US 11,924,136 B2
(45) Date of Patent: Mar. 5, 2024

(54) METHOD AND DEVICE FOR TRANSMITTING/RECEIVING SOUNDING REFERENCE SIGNALS IN WIRELESS COMMUNICATION SYSTEM

(71) Applicant: LG ELECTRONICS INC., Seoul (KR)

(72) Inventors: Seongwon Go, Seoul (KR); Jiwon Kang, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/915,063

(22) PCT Filed: Apr. 2, 2021

(86) PCT No.: PCT/KR2021/004151
§ 371 (c)(1),
(2) Date: Sep. 27, 2022

(87) PCT Pub. No.: WO2021/206382
PCT Pub. Date: Oct. 14, 2021

(65) Prior Publication Data
US 2023/0147579 A1 May 11, 2023

(30) Foreign Application Priority Data
Apr. 7, 2020 (KR) .......... 10-2020-0042130

(51) Int. Cl.
*H04L 5/00* (2006.01)
(52) U.S. Cl.
CPC .......... *H04L 5/0051* (2013.01); *H04L 5/0062* (2013.01)

(58) Field of Classification Search
CPC ..... H04L 1/1678; H04L 27/261; H04L 5/001; H04L 5/0012; H04L 5/0023;
(Continued)

(56) References Cited

U.S. PATENT DOCUMENTS

| 2020/0092880 A1 | 3/2020 | Choi et al. |
| 2022/0104216 A1* | 3/2022 | Wu ................. H04W 72/1273 |
| 2022/0232535 A1* | 7/2022 | Abdelghaffar .... H04W 72/0453 |

FOREIGN PATENT DOCUMENTS

| CN | 109923828 | 6/2019 |
| CN | 110582952 | 12/2019 |

(Continued)

OTHER PUBLICATIONS

"3rd Generation Partnership Project; Technical Specification Group Radio Access Network; NR; Physical layer procedures for control (Release 16)", 3GPP TS 38.213 V16.1.0 (Mar. 2020), pp. 1-156.

(Continued)

*Primary Examiner* — Mansour Oveissi
(74) *Attorney, Agent, or Firm* — BRYAN CAVE LEIGHTON PAISNER LLP

(57) ABSTRACT

Disclosed are a method and device for transmitting/receiving sounding reference signals in a wireless communication system. A method for transmitting sounding reference signals (SRS) according to one embodiment of the present disclosure may comprise the steps of: receiving, from a base station, setting information related to slot setting; receiving, from the base station, downlink control information (DCI) for triggering transmission of an SRS for an SRS resource set; and transmitting the SRS to the base station in the SRS resource set. One or more SRS transmission symbols for transmission of the SRS are determined, and in the one or more SRS transmission symbols, downlink scheduling may (Continued)

not be performed in one or more symbols that have been set as flexible symbols by the setting information.

8 Claims, 13 Drawing Sheets

(58) Field of Classification Search
CPC ... H04L 5/0048; H04L 5/0051; H04L 5/0085; H04L 5/0091; H04L 5/14; H04W 72/0446; H04W 72/0453; H04W 72/23
See application file for complete search history.

(56) References Cited

FOREIGN PATENT DOCUMENTS

| | | |
|---|---|---|
| CN | 110583077 | 12/2019 |
| JP | 2014007710 | 1/2014 |
| WO | 2019194589 | 10/2019 |
| WO | 2019194669 | 10/2019 |
| WO | 2020084362 | 4/2020 |

OTHER PUBLICATIONS

"Correction on slot configurations", 3GPP TSG-RAN WG1 Meeting #98bis, Chongqing, China, Oct. 14-20, 2019. R1-1910428.
"On the TBS issue and the TEI issue of half-duplex operation in CA", 3GPP TSG RAN WG1 Meeting #100, e-Meeting, Feb. 24-Mar. 6, 2020, R1-2000514.
"Outcome of email thread [100e-NR-TEICRs-02]", 3GPP TSG RAN WG1 #100-e, e-Meeting, Feb. 24-Mar. 6, 2020. R1-2001232.
OPPO, "Remaining issues on SRS design," 3GPP TSG RAN WG1 Meeting #92bis, R1-1803971, dated Apr. 2018.
Sony, "Remaining issues on downlink beam management," 3GPP TSG-RAN WG1 #92bis, R1-1804593, dated Apr. 2018
NTT Docomo, Inc., "Outcome of email thread [100e-NR-TEICRs-02]," 3GPP TSG RAN WG1 #100-e, R1-2001232, dated Mar. 2020.

* cited by examiner

METHOD AND DEVICE FOR TRANSMITTING/RECEIVING SOUNDING REFERENCE SIGNALS IN WIRELESS COMMUNICATION SYSTEM

CROSS-REFERENCE TO RELATED APPLICATIONS

This application claims the benefit of earlier filing date and right of priority to Korean Application No. PCT/KR2021/004151, filed on Apr. 2, 2021, which claims benefit of Korean Patent Application No. 10-2020-0042130 filed, Apr. 7, 2020, the contents of which are all hereby incorporated by reference herein in their entirety.

TECHNICAL FIELD

The present disclosure relates to a wireless communication system, and in more detail, relates to a method and an apparatus of transmitting and receiving a sounding reference signal in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus in which a terminal transmits an uplink channel and/or a sounding reference signal (SRS).

In addition, an additional technical object of the present disclosure is to provide a method and an apparatus for transmitting an uplink channel and/or an SRS when transmission between an uplink channel and an SRS collides.

In addition, an additional technical object of the present disclosure is to provide a method and an apparatus for transmitting and receiving an SRS when a transmission location of an SRS corresponds a flexible symbol.

The technical objects to be achieved by the present disclosure are not limited to the above-described technical objects, and other technical objects which are not described herein will be clearly understood by those skilled in the pertinent art from the following description.

Technical Solution

A method of transmitting a sounding reference signal (SRS) in a wireless communication system according to an aspect of the present disclosure may include: receiving, from a base station, configuration information related to a slot configuration; receiving, from the base station, downlink control information (DCI) for triggering transmission of an SRS for an SRS resource set; and transmitting, to the base station, the SRS in the SRS resource set. One or more SRS transmission symbols for transmission of the SRS may be determined, and in the one or more SRS transmission symbols, downlink scheduling may be not performed on one or more symbols.

A method of receiving a sounding reference signal (SRS) in a wireless communication system according to an additional aspect of the present disclosure may include: transmitting, to a terminal, configuration information related to a slot configuration; transmitting, to the terminal, downlink control information (DCI) for triggering transmission of an SRS for an SRS resource set; and receiving, from the terminal, the SRS in the SRS resource set. One or more SRS transmission symbols for transmission of the SRS may be determined, and in the one or more SRS transmission symbols, downlink scheduling may be not performed on one or more symbols configured as flexible symbols by the configuration information.

Advantageous Effects

According to an embodiment of the present disclosure, even though a collision between an SRS and an uplink channel may occur, by defining an operation for resolving the collision, a collision between an SRS and an uplink channel can be prevented.

In addition, according to an embodiment of the present disclosure, even though a collision between an SRS and an uplink channel may occur, by defining an operation for resolving the collision, ambiguity about an uplink transmission method can be resolved.

In addition, according to an embodiment of the present disclosure, even though an SRS transmission symbol corresponds to a flexible symbol, collision with other downlink/uplink channels/signals can be prevented.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
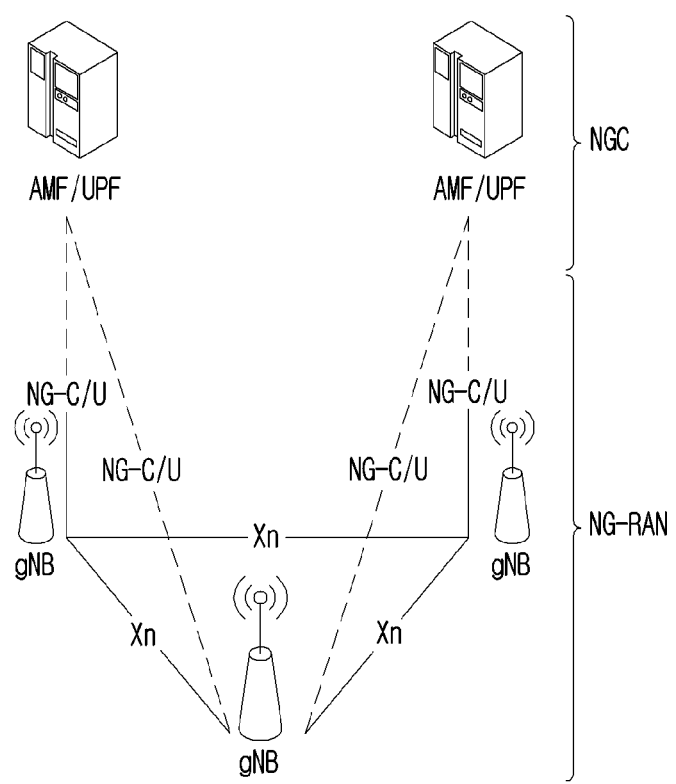
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
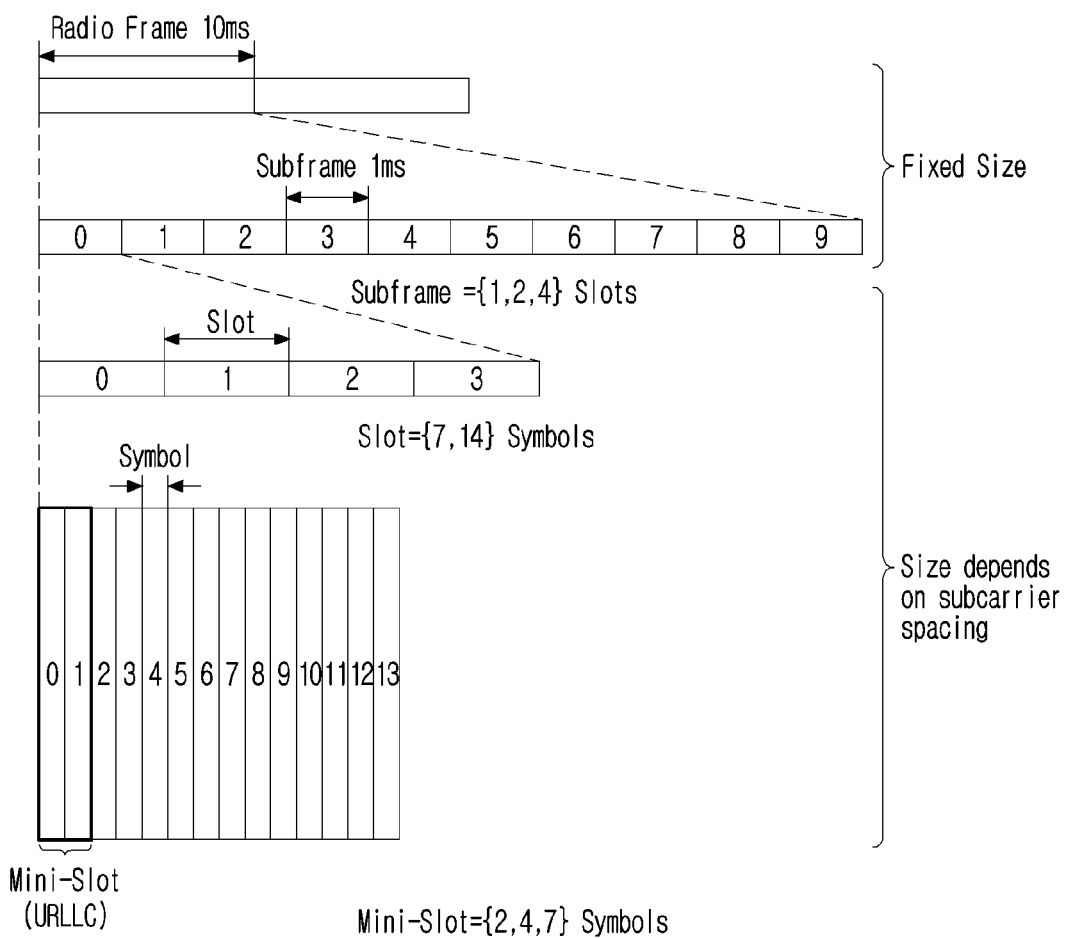
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^μ \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c = 10$ ms. Here, a radio frame is configured with 10 subframes having a duration of $T_{sf}=(\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^μ \in \{0, \ldots, N_{slot}^{subframe,μ}-1\}$ in a subframe and are numbered in an increasing order of $n_{s,f}^μ \in \{0, \ldots, N_{slot}^{frame,μ}-1\}$ in a radio frame. One slot is configured with $N_{symb}^{slot}$ consecutive OFDM symbols and $N_{symb}^{slot}$ is determined according to CP. A start of a slot $n_s^μ$ in a subframe is temporally arranged with a start of an OFDM symbol $n_s^μ N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$) the number of slots per radio frame ($N_{slot}^{frame,μ}$) and the number of slots per subframe ($N_{slot}^{subframe,μ}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |

TABLE 3-continued

| μ | $N_{symb}^{slot}$ | $N_{slot}^{frame,μ}$ | $N_{slot}^{subframe,μ}$ |
|---|---|---|---|
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
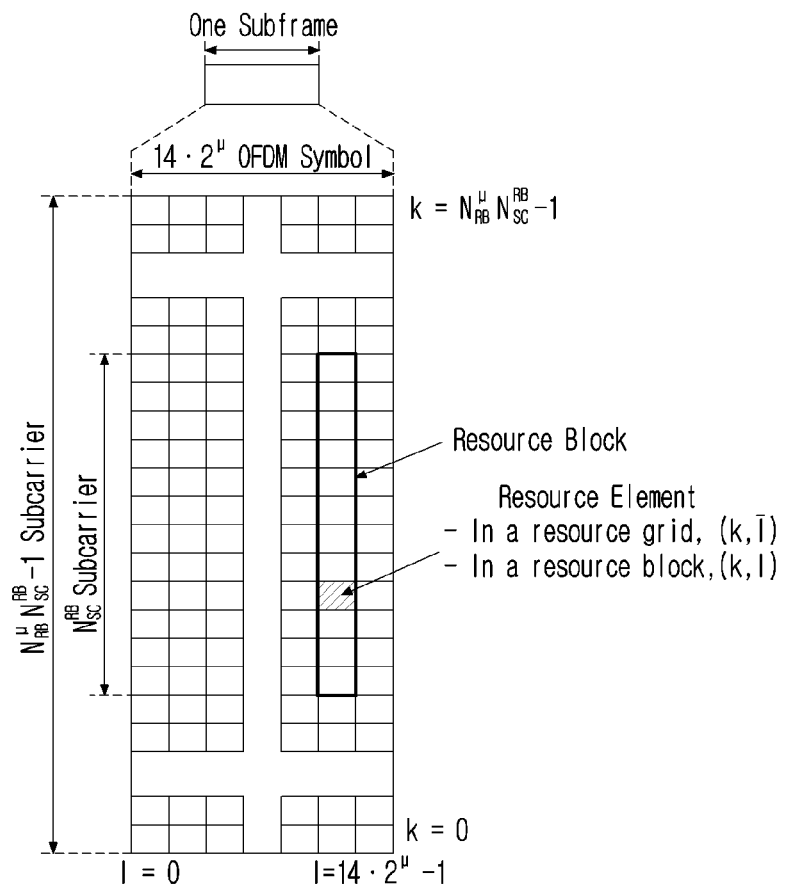
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^μ N_{sc}^{RB}$ subcarriers in a frequency domain and one subframe is configured with $14 \cdot 2^μ$ OFDM symbols, but it is not limited thereto. In an NR system, a transmitted signal is described by OFDM symbols of $2^μ N_{symb}^{(μ)}$ and one or more resource grids configured with $N_{RB}^μ N_{sc}^{RB}$ subcarriers. Here, $N_{RB}^μ \le N_{RB}^{max,μ}$. The $N_{RB}^{max,μ}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^μ N_{sc}^{RB}-1$ is an index in a frequency domain and $l'=0, \ldots, 2^μ N_{symb}^{(μ)}-1$ refers to a position of a symbol in a subframe. When referring to a resource element in a slot, an index pair (k,l) is used. Here, $l=0, \ldots, N_{symb}^μ-1$. A resource element (k,l') for μ and an antenna port p corresponds to a complex value, $a_{k,l'}^{(p,μ)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration p. The center of subcarrier 0 of common resource block 0 for a subcarrier spacing configuration µ is identical to 'point A'. A relationship between a common resource block number $n_{CRB}^{\mu}$ and a resource element (k,l) for a subcarrier spacing configuration p in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block nPRB and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
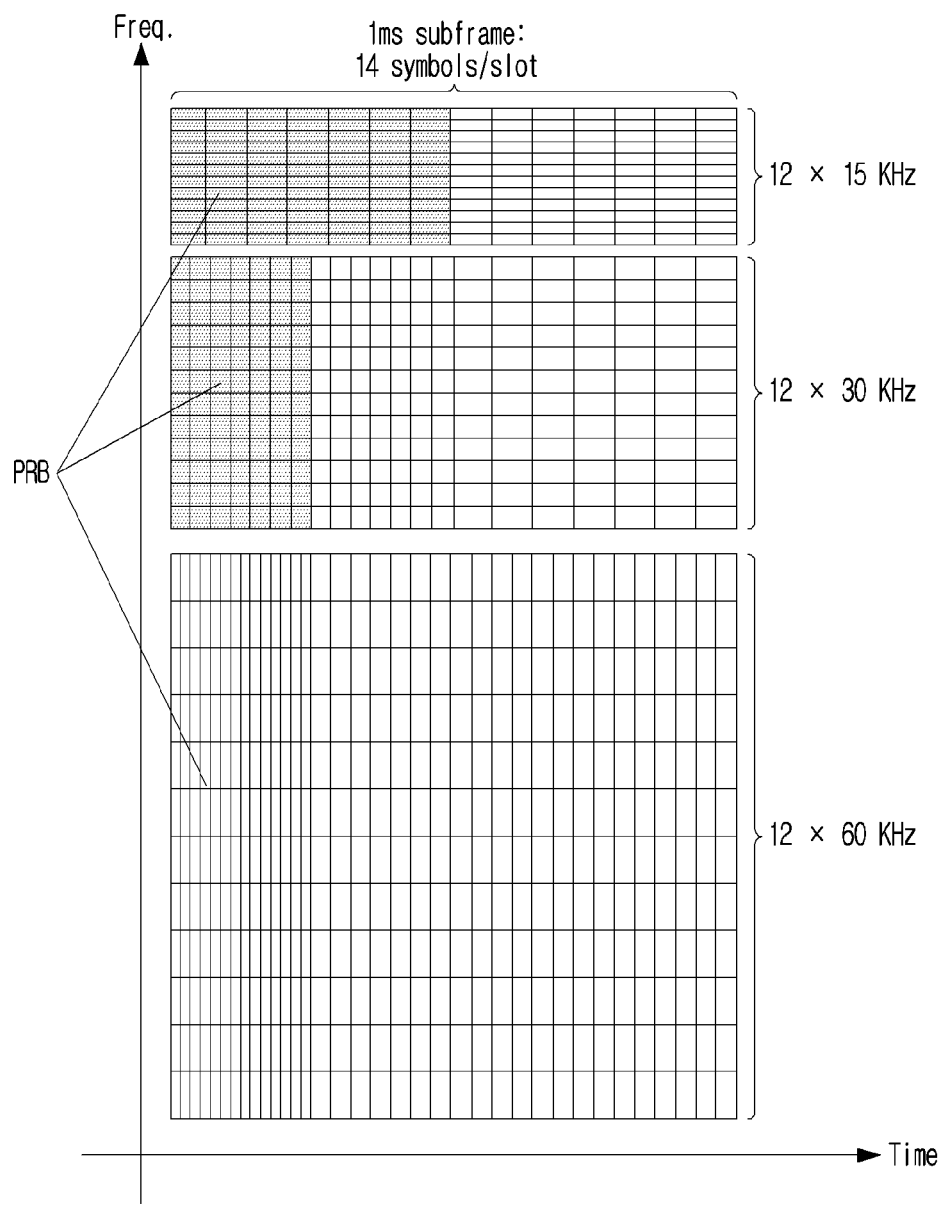
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
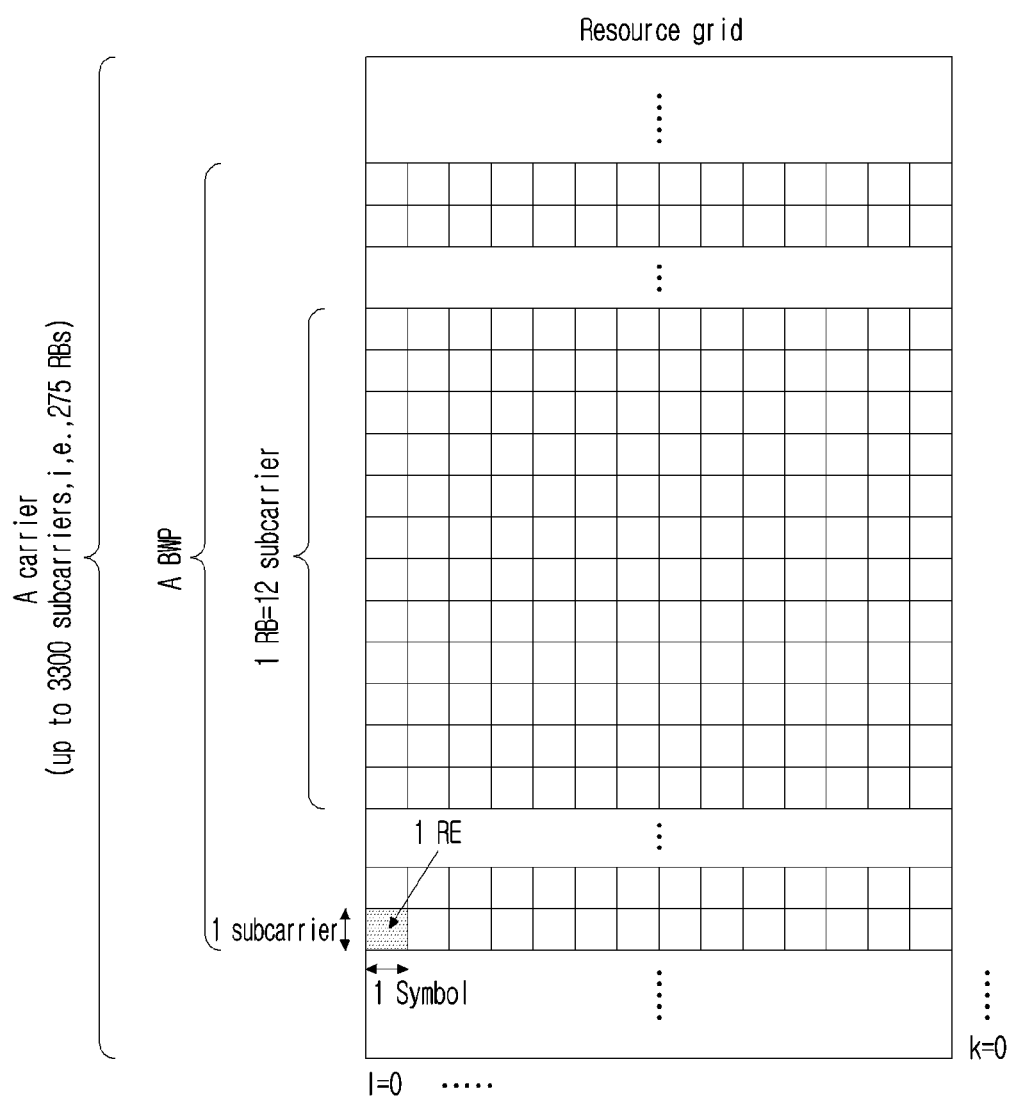
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
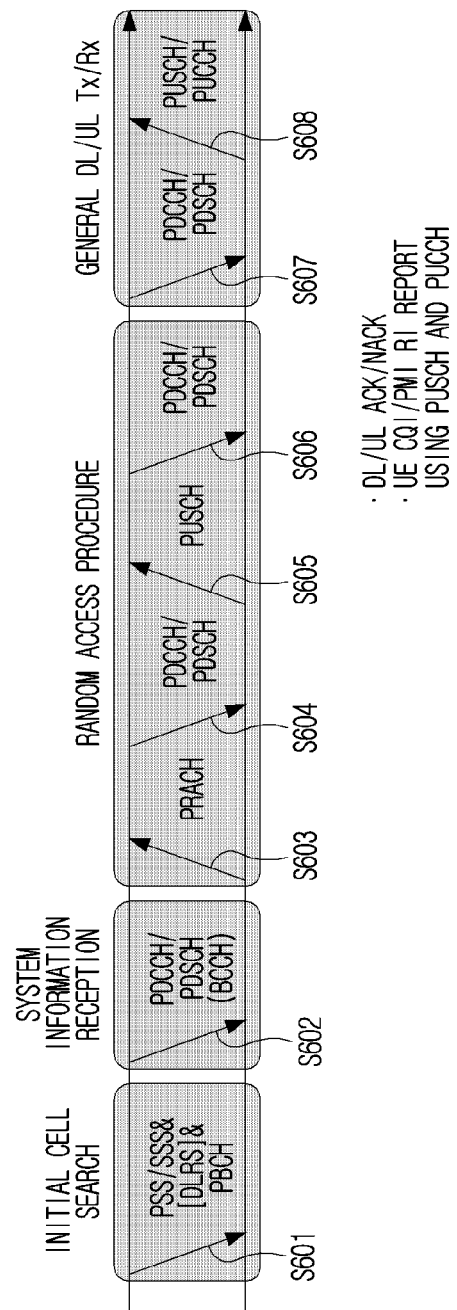
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 51

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted. DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be predefined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Carrier Aggregation (CA)

A communication environment considered in embodiments of the present disclosure includes all multi-carrier support environments. In other words, a multi-carrier system or a carrier aggregation (CA) system used in the present disclosure refers to a system which aggregates and uses 1 or more component carriers (CC) having bandwidth smaller than target band when configuring target broadband in order to support broadband.

In the present disclosure, multi-carriers mean aggregation of a carrier (or, carrier aggregation) and in this case, carrier aggregation means both aggregation between contiguous carriers and aggregation between non-contiguous carriers. In addition, the number of component carriers aggregated between a downlink and an uplink may be configured differently. Such carrier aggregation may be used interchangeably with a term such as carrier aggregation, bandwidth aggregation, spectrum aggregation, etc.

The above-described carrier aggregation environment may be referred to as a multiple cells environment. A cell is defined as a combination of one pair of a downlink resource (DL CC) and an uplink resource (UL CC), but an uplink resource is not an essential element. In other words, carrier aggregation may be understood as aggregation of two or more cells with each different carrier frequency (center frequency of a cell). 'A cell' referred to here should be distinguished from a generally used 'cell' as a region covered by a base station.

A cell used in a LTE-A system includes a primary cell (PCell) and a secondary cell (SCell). A PCell and a SCell may be used as a serving cell.

If N DL CCs are managed in a specific cell, a network may allocate M (M≤N) DL CCs to a terminal. In this case, a terminal may monitor only M limited DL CCs and receive a DL signal. In addition, a network may allocate a main DL CC to a terminal by giving priority to L (L≤N) DL CCs and in this case, UE should monitor L DL CCs. Such a method may be equally applied to uplink transmission.

Linkage between a carrier frequency of a downlink resource (or a DL CC) and a carrier frequency of an uplink resource (or an UL CC) may be indicated by system information or a higher layer message like a RRC message. For example, a combination of a DL resource and an UL resource may be configured by linkage defined by SIB2 (System Information Block Type2). Specifically, linkage may mean a mapping relationship between a DL CC that a PDCCH carrying an UL grant is transmitted and an UL CC which uses the UL grant and may also mean a mapping relationship between a DL CC (or an UL CC) that data for HARQ is transmitted and an UL CC (or a DL CC) that a HARQ ACK/NACK signal is transmitted.

In a system supporting carrier aggregation, a cell may be divided as in the following FIG. 7.

Figure 7:
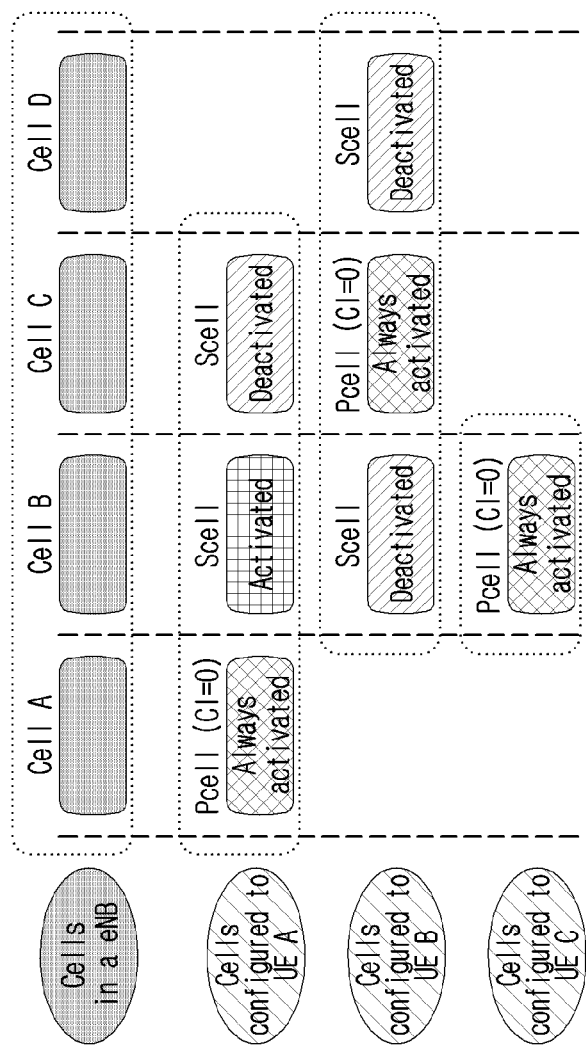
FIG. 7 illustrates an example of cell division in a wireless communication system to which the present disclosure may be applied.

FIG. 7 illustrates an example of cell division in a wireless communication system to which the present disclosure may be applied.

A configured cell is configured per UE as a cell configured to perform carrier aggregation based on measurement report among cells of a base station as in FIG. 7. A configured cell pre-reserves a resource for ACK/NACK transmission for PDSCH transmission. An activated cell performs CSI reporting and SRS transmission for PDSCH/PUSCH transmission as a cell configured to actually transmit a PDSCH/a PUSCH among configured cells. A de-activated cell stops CSI reporting and SRS transmission as a cell configured not to perform PDSCH/PUSCH transmission by a timer operation or a command of a base station.

Sounding Reference Signal (SRS) Transmission and Reception Method

Hereinafter, in the present disclosure, a HARQ (hybrid automatic repeat request) reference configuration method is described for a configuration and an indication of an additional SRS between a base station and a terminal (UE). In addition, an operation of UE for a DL HARQ and an UL HARQ is described based on a corresponding configuration. In addition, based on a pre-configuration of transmittable subframe(s) of an additional SRS between a base station and UE and subframe(s) prioritizing an additional SRS, an operation of UE for preventing an additional SRS from colliding with other UL channels is described. Last, an operation of UE for collision between an additional SRS and a PUSCH or for collision between SRSs in a carrier aggregation (CA) situation is described.

In reference to a LTE standard to Rel-15, a SRS (Sounding Reference Signal) may be transmitted in a last symbol of each subframe in a FDD (Frequency Division Duplex) system. In addition, in a TDD (Time Division Duplex) system, a SRS may be transmitted in 1 symbol or 2 symbols according to a special subframe configuration by additionally using UpPTS in a special subframe other than SRS transmission in an UL normal subframe. In addition, a SRS may be transmitted in 2 symbols or 4 symbols according to whether a SC-FDMA symbol for an UL is additionally configured other than the existing UpPTS in a special subframe. In LTE, a SRS may be divided into type 0 and type 1 triggering according to a time domain characteristic. For type 0, it is a periodic SRS based on a higher layer configuration and for type 1, it is an aperiodic SRS triggered by DCI.

Hereinafter, a discussion on MIMO improvement (additional SRS) in LTE is described.

In determining additional SRS symbol(s), a non-CA (carrier aggregation) situation should be considered in TDD, a non-CA (carrier aggregation) situation should be considered in TDD and a CA situation should be considered in FDD-TDD.

A time position of possible additional SRS symbol(s) in one normal UL subframe in one cell includes the following:

Option 1: All symbols in one slot may be used for a SRS from a cell point of view. For example, other slot in the subframe may be used for PUSCH transmission for a shortened TTI (sTTI: shortened Transmission Time Interval)-possible UE.

Option 2: All symbols in one subframe may be used for a SRS from a cell point of view.

Option 3: A subset of symbols in one slot may be used for a SRS from a cell point of view. For example, other slot in the subframe may be used for PUSCH transmission for a shortened TTI-possible UE.

At least in a low downlink SINR (signal-to-interference-plus-noise ratio) region, support of additional SRS symbols per UE in a normal subframe may obtain gain of downlink performance.

Aperiodic SRS transmission for additional SRS symbol(s) is supported.

A time position of possible additional SRS symbol(s) in one normal uplink subframe in one cell is selected from the following options.

Option 1: All symbols may be used for a SRS from a cell point of view only in one slot in one subframe.

Option 2: All symbols in one subframe may be used for a SRS from a cell point of view.

For UE that additional SRS symbols in one UL subframe are configured, SRS transmission is selected from the following options.

Option 1: Frequency hopping in one UL subframe is supported.

Option 2: Repetition in one UL subframe is supported.

Option 3: Both frequency hopping and repetition in one UL subframe are supported.

Both intra-subframe frequency hopping and repetition are supported for an aperiodic SRS in additional symbols.

Intra-subframe antenna switching is supported for an aperiodic SRS in additional symbols.

In conclusion, a term of 'additional SRS symbols' is introduced in release-16 and a last symbol is not a part of 'additional SRS symbols' (i.e., not included).

A legacy SRS and additional SRS symbol(s) may be configured for the same UE.

When a legacy SRS is aperiodic, UE may transmit one of a legacy SRS or additional SRS symbol(s) in the same subframe.

When a legacy SRS is periodic, UE may transmit a legacy SRS and additional SRS symbol(s) in the same of a different subframe.

The number of additional SRS symbols which may be configured for UE is 1~13.

For a time position of possible additional SRS symbols in one normal UL subframe in one cell, 1 to 13 symbols in one subframe may be used for a SRS from a cell point of view.

The same power control configuration is applied to all additional SRS symbols configured for single UE.

Transmission of an aperiodic legacy SRS and aperiodic additional SRS symbol(s) in the same subframe of UE is supported.

In an UL normal subframe of a LTE TDD system to Rel-15, both a SRS for a specific cell (i.e., a cell-specific SRS) and a SRS for specific UE (i.e., an UE-specific SRS) may be configured only in one symbol (e.g., a last symbol) in one subframe.

In Rel-16 LTE MIMO enhancement, it was agreed to support only an aperiodic SRS in an additional SRS of an UL normal subframe.

The existing legacy SRS has a purpose of UL channel state information (CSI) acquisition for UL scheduling, UL link adaptation, DL CSI acquisition for DL scheduling with DL/UL reciprocity, etc. An additional SRS, unlike a legacy SRS, is mainly intended to acquire DL information of each cell by using DL/UL reciprocity in a single serving cell or multi cells (i.e., a carrier aggregation (CA) environment). A legacy SRS was transmitted only in a last symbol of the existing UL normal subframe. An additional SRS, unlike a legacy SRS, may be transmitted through multi symbols at a position of other symbol excluding a last symbol. Accordingly, a PUSCH and/or a PUCCH of other UE other than corresponding UE may collide with a SRS transmitted by UE in a time domain according to a configuration. In addition, even for UE itself transmitting a SRS, there is a possibility that its SRS and its PUSCH and/or PUCCH will collide.

Especially, when HARQ ACK/NACK feedback of UE for DL data collides with the additional SRS, DL throughput degradation occurs. In preparation for this case, an UL subframe may be divided into two types, a DL HARQ feedback dedicated subframe and a subframe that an additional SRS may be transmitted, by reusing a concept of a HARQ reference configuration and accordingly, DL HARQ feedback and an additional SRS may not collide.

But, even in this case, when feedback of a base station for UL data of UE (e.g., a PHICH (Physical channel HybridARQ Indicator Channel)) comes down to NACK, retransmission timing of UL data belongs to a subframe that an additional SRS may be transmitted and accordingly, a problem occurs that UL retransmission and an additional SRS may collide. In the present disclosure, an UE operation in this case is proposed.

UE which applies at least one proposed operation among proposals in the present disclosure is referred to as "enhanced UE" for convenience and as an example, it includes UE which may perform an operation for configuring/applying/transmitting the additional SRS such as Rel-16 UE, etc.

In addition, unless otherwise stated in the present disclosure, an additional SRS means both a periodic additional SRS and an aperiodic additional SRS. But, in a description of a proposal, only when trigger/triggering is additionally mentioned, there may be a limit that an additional SRS means an aperiodic additional SRS.

In addition, when a SRS resource is transmitted in the present disclosure, it may mean that a SRS is mapped and transmitted in a corresponding frequency/time/space resource.

Embodiment 1

Method 1: When a HARQ Reference Configuration is Utilized in an Additional SRS, DL/UL HARQ Operation Method Between Base Station and Terminal A method for preparing a case in which an additional SRS configured/indicated to UE and a PUCCH and/or a PUSCH of corresponding UE collide is proposed. For it, a base station may configure a DL HARQ feedback (e.g., PUCCH) dedicated UL subframe to corresponding UE through a configuration of a DL HARQ reference configuration. And, additional SRS transmission of enhanced UE may be prohibited in a corresponding configured UL subframe. Accordingly, collision of an additional SRS and DL HARQ feedback (e.g., a PUCCH) in enhanced UE may be prevented.

In other words, an UL subframe may be divided into two types, a DL HARQ feedback dedicated subframe and a subframe that an additional SRS may be transmitted. Accordingly, DL HARQ feedback (e.g., a PUCCH) and an additional SRS may not collide basically.

Separately, for a PUSCH scheduled by a base station, it may be scheduled for these two types of subframes, a DL HARQ feedback dedicated subframe and a subframe that an additional SRS may be transmitted. Here, collision of an additional SRS and a scheduling PUSCH may be avoided at a base station's (e.g., eNB) discretion (i.e., by controlling a PUSCH resource allocation position). But, there is large in the number of cases between a retransmission PUSCH and an additional SRS in retransmission due to a failure in PUSCH transmission, so collision is highly likely to occur. Accordingly, methods for preventing corresponding collision are proposed as below.

Proposal 1: When a DL/UL configuration (or a TDD configuration) configured for one cell (through a system information block (SIB)) is 1/2/3/4/5

Proposal 1-1: When a PUSCH is transmitted through an UL subframe (and/or a specific UL subframe among other DL HARQ feedback non-dedicated UL subframes (e.g., an UL subframe that additional SRS transmission is not configured/indicated)) in a DL HARQ reference configuration, UE may operate according to at least one of the following options.

Option 1: UE may detect/receive a PHICH for a corresponding PUSCH (same as before) and reflect/apply a result of PHICH detection/reception to retransmission of a corresponding PUSCH.

Here, the PUSCH may include all types of PUSCHs including retransmission of an initially transmitted PUSCH (hereinafter, an initial PUSCH) and a previously transmitted PUSCH (e.g., a PUSCH transmitted when UE decodes a PHICH (Physical channel HybridARQ Indicator Channel) and receives NACK through the PHICH after initial PUSCH transmission) (hereinafter, a retransmission PUSCH).

Proposal 1-2: When a PUSCH is transmitted through a subframe, not an UL subframe in a DL HARQ reference configuration (and/or a specific UL subframe among other DL HARQ feedback non-dedicated UL subframes (e.g., an UL subframe that additional SRS transmission is configured/indicated)), UE may operate according to at least one of the following options.

Here, the PUSCH may include all types of PUSCHs including retransmission of an initially transmitted PUSCH (hereinafter, an initial PUSCH) and a previously transmitted PUSCH (e.g., a PUSCH transmitted when UE decodes a PHICH and receives NACK through the PHICH after initial PUSCH transmission) (hereinafter, a retransmission PUSCH).

Option 2: UE may operate not to detect/receive a PHICH for a corresponding PUSCH. And/or, UE may operate by assuming a corresponding PHICH as ACK. In other words, retransmission for a corresponding PUSCH may be no longer performed.

Option 3: UE may operate not to detect/receive a PHICH for a corresponding PUSCH. And/or, UE may operate by assuming a corresponding PHICH as ACK. And, whether a corresponding PUSCH is retransmitted may be determined based on a HARQ process number or a new data indicator (NDI) of UL DCI received from a base station (i.e., DCI for UL channel scheduling). In other words, if contents of a corresponding PHICH is NACK, a base station may derive retransmission from an UL subframe in a DL HARQ reference configuration by newly performing PUSCH scheduling (e.g., using a HARQ process number or a NDI of UL DCI).

Option 4: UE may also apply an operation of the option 1 to a corresponding PUSCH. In other words, UE may detect/receive a PHICH for a corresponding PUSCH (same as before) and reflect/apply a result of PHICH detection/reception to retransmission of a corresponding PUSCH. Here, when a retransmission PUSCH of a corresponding PUSCH and additional SRS transmission are indicated/configured for the same UL subframe (SF), UE may drop PUSCH transmission and perform only additional SRS transmission. In other words, an additional SRS may have higher priority than PUSCH retransmission. Even when a frequency domain resource allocated as a retransmission PUSCH and a frequency domain region allocated as an additional SRS are configured for the same UL subframe although they are not completely overlapped, an operation of the option 4 may be performed.

For example, an operation of a terminal when TDD configuration (i.e., DL/UL configuration) 2 is configured as in the following table 6 in a specific cell is described.

TABLE 6

| SF#0 | #1 | #2 | #3 | #4 | #5 | #6 | #7 | #8 | #9 |
|---|---|---|---|---|---|---|---|---|---|
| DL | SSF | UL | DL | DL | DL | SSF | UL | DL | DL |

In Table 6, SF #0 to SF #9 represent a subframe index, respectively. And, DL represents a downlink subframe, UL represents an uplink subframe and SSF represents a special subframe.

A case is assumed that as an UL normal subframe of SF #2 is configured as a DL HARQ reference configuration of a corresponding cell, SF #2 is a DL HARQ feedback (PUCCH) dedicated subframe (SF). If PUSCH scheduling occurs to UE in SF #2, UE may perform an UL HARQ operation as in the option 1. On the other hand, if PUSCH scheduling occurs to UE in SF #7, UE may perform at least one UL HARQ operation among the option 2, 3, 4.

The above-described proposal 1 proposes a method for avoiding collision of a retransmission PUSCH and an additional SRS for a case in which a DL/UL configuration (or a TDD configuration) configured for a specific cell (through a SIB) is 1/2/3/4/5. In this case, RTT (round-trip time) of a PUSCH (from a PUSCH to a retransmission PUSCH) is 10 ms, so retransmission for PUSCH transmission in UL SF index X is performed through the same SF index X after 10 ms. Accordingly, when a PUSCH is transmitted through an UL subframe in a DL HARQ reference configuration, there is no possibility that a retransmission PUSCH and an additional SRS will collide, so the option 1 may be performed. On the other hand, when a PUSCH is transmitted through a subframe, not an UL subframe in a DL HARQ reference configuration, there is a possibility that a retransmission PUSCH and an additional SRS will collide, so a proposal for solving a collision problem may be performed as in the option 2, 3, 4.

Proposal 2: When a DL/UL configuration configured for one cell (through a SIB) is 0/6

Proposal 2-1: When a PUSCH is transmitted through any subframe, UE may operate according to at least one of the following options.

Here, the PUSCH may include all types of PUSCHs including retransmission of an initially transmitted PUSCH (hereinafter, an initial PUSCH) and a previously transmitted PUSCH (e.g., a PUSCH transmitted when UE decodes a PHICH and receives NACK after initial PUSCH transmission)(hereinafter, a retransmission PUSCH).

Option 2: UE may operate not to detect/receive a PHICH for a corresponding PUSCH. And/or, UE may operate by assuming a corresponding PHICH as ACK. In other words, retransmission for a corresponding PUSCH may be no longer performed.

Option 3: UE may operate not to detect/receive a PHICH for a corresponding PUSCH. And/or, UE may operate by assuming a corresponding PHICH as ACK. And, whether a corresponding PUSCH is retransmitted may be determined based on a HARQ process number or a NDI of UL DCI received from a base station (i.e., DCI for UL channel scheduling). In other words, if contents of a corresponding PHICH is NACK, a base station may derive retransmission from an UL subframe in a DL HARQ reference configuration by newly performing PUSCH scheduling (e.g., using a HARQ process number or a NDI of UL DCI).

Option 4: UE may also apply an operation of the option 1 to a corresponding PUSCH. In other words, UE may detect/receive a PHICH for a corresponding PUSCH (same as before) and reflect/apply a result of PHICH detection/reception to retransmission of a corresponding PUSCH. Here, when a retransmission PUSCH of a corresponding PUSCH and additional SRS transmission are indicated/configured for the same UL subframe (SF), UE may drop PUSCH transmission and perform only additional SRS transmission. In other words, an additional SRS may have higher priority than PUSCH retransmission. Even when a frequency domain resource allocated as a retransmission PUSCH and a frequency domain region allocated as an additional SRS are configured for the same UL subframe although they are not completely overlapped, an operation of the option 4 may be performed.

For the above-described proposal 2, when a DL/UL configuration (i.e., a TDD configuration) configured for a specific cell (through a SIB) is 0/6, RTT (round-trip time) of a PUSCH (from a PUSCH to a retransmission PUSCH) is not 10 ms. Accordingly, a possibility of collision between a retransmission PUSCH and an additional SRS is not changed according to whether it is an UL subframe in a DL HARQ reference configuration and a possibility of collision may always exists. Therefore, also in this case, a proposal for solving a collision problem may be performed as in the option 2, 3, 4.

Proposal 3: Regardless of a DL/UL configuration configured for one cell (through a SIB), when an additional SRS triggered by a base station in any subframe collides with a retransmission PUSCH (i.e., a PUSCH transmitted by UE decoding a PHICH and receiving NACK after initial PUSCH transmission), UE may drop additional SRS transmission and perform only retransmission of a PUSCH. In other words, a retransmission PUSCH may have higher priority than an additional SRS. In other words, after initial PUSCH transmission, a HARQ process of detecting a PHICH and retransmitting UL data (a retransmission PUSCH) may be prioritized over an additional SRS. Here, even when a frequency domain resource allocated as a retransmission PUSCH and a frequency domain region allocated as an additional SRS are configured for the same UL SF although they are not completely overlapped, an operation of the above-described proposal 3 may be performed.

A proposal of the above-described method 1 (i.e., proposal 1 to proposal 3) may be also applied to an intra-band CA or intra-band CA situation without being limited to 1 component carrier (CC) or 1 band. For example, for the same operation as option 4 in the proposal 1 and 2, when PUSCH retransmission in a specific CC and an additional SRS configured in other CC occur at the same time, an additional SRS may still have high priority.

For the above-described proposal 3, it is assumed that for a PUSCH which is initially scheduled by a base station and an additional SRS which is triggered by a base station, they may be controlled to avoid collision at a base station's discretion. Accordingly, when an initial PUSCH transmitted by UE fails in transmission and sends a retransmission PUSCH after that, it may collide with an additional SRS triggered by a base station, so a method for controlling corresponding collision was proposed. As importance of a retransmission PUSCH or a PUSCH carrying data may be higher than that of an additional SRS for obtaining DL CSI, an UE operation is proposed accordingly.

Method 2: Method of Preventing Collision with an Additional SRS and Other UL Channel (e.g., a PUCCH, a PUSCH, etc.) Through a Configuration/An Indication of Transmittable Subframe(s) of an Additional SRS of a Base Station and/or a Configuration/An Indication of Subframe(s) Prioritizing an Additional SRS and an UE Operation According to a Corresponding Method According to Method 2, subframe(s) which may transmit an additional SRS and/or subframe(s) prioritizing an additional SRS may be preconfigured. As such, subframe(s) that an additional SRS may be transmitted and/or that an additional SRS is prioritized are preconfigured, so collision between an additional SRS and other UL channel may be prevented and in addition, ambiguity in an UE operation may be resolved.

Proposal 1: A base station may configure/indicate 'an additional SRS transmittable subframe set (one subframe set may include one or more subframes)' to UE. And, additional SRS transmission timing of subsequent UE after the configuration/indication may be always included within the subframe set. In other words, after additional SRS triggering through DL/UL DCI transmission of a base station, UE may not transmit an additional SRS in any subframe, but may transmit an additional SRS only in a subframe which belongs to the 'additional SRS transmittable subframe set'.

The 'additional SRS transmittable subframe set' may be indicated/updated through a higher layer (e.g., RRC layer) configuration as one or multiple sets. And, a specific set of them may be indicated/updated by a lower layer (e.g., a MAC CE (control element) or DCI) (e.g., a n-bit field). For example, additional SRS transmittable subframe set 1 to 5 may be preconfigured through RRC signaling and one or more sets of them may be indicated/added by lower layer signaling (a MAC CE or DCI). In addition, one or more specific sets of such indicated/added sets may be deleted.

Proposal 1-1: A base station may trigger an additional SRS to UE through DL grant DCI (i.e., DCI scheduling a downlink channel).

In this case, when additional SRS transmission is triggered through DL grant DCI in subframe n (n is a natural number), UE may determine the earliest candidate additional SRS subframe including/after n+4 (or, when a separate candidate subframe is not configured, the earliest UL subframe) as an actual additional SRS transmission subframe. In other words, UE may transmit an additional SRS in the earliest candidate additional SRS subframe (or the earliest UL subframe) of subframe k (k≥n+4, k is a natural number).

Proposal 1-2: A base station may trigger an additional SRS to UE through UL grant DCI (i.e., DCI scheduling an uplink channel).

In this case, when additional SRS transmission is triggered through UL grant DCI in subframe n (n is a natural number), UE may determine the earliest candidate additional SRS subframe after a PUSCH transmission subframe scheduled by corresponding DCI (or, when a separate candidate subframe is not configured, the earliest UL subframe) as an actual additional SRS transmission subframe. In other words, UE may transmit an additional SRS in the earliest candidate additional SRS subframe (or the earliest UL subframe) of subframe k (k PUSCH transmission subframe index, k is a natural number).

The earliest candidate additional SRS subframe in the above-described proposal 1-1 and proposal 1-2 refers to the earliest subframe in a time domain among subframe(s) in the 'additional SRS transmittable subframe set' (e.g., a subframe with the smallest subframe index).

Proposal 2: A base station may configure/indicate 'a subframe set prioritizing an additional SRS (one subframe set may include one or more subframes)' to UE. And, additional SRS transmission timing of subsequent UE after the configuration/indication may follow legacy aperiodic SRS (AP-SRS) transmission timing. In other words, if a trigger occasion is n, a SRS may be transmitted in an UL subframe after n+4. Here, when a corresponding additional SRS collides with other UL channel (e.g., a PUCCH, a PUSCH, a SRS for other cell) in the same subframe within one cell, UE may determine whether to prioritize an additional SRS over other UL channel according to whether a corresponding subframe is the 'additional SRS prioritized subframe (i.e., a subframe included in the additional SRS prioritized subframe set)'.

In other words, when an additional SRS and other UL channel collide, UE may operate as follows. i) When a corresponding subframe is the additional SRS prioritized subframe, UE may transmit an additional SRS by prioritizing an additional SRS over an UL channel. On the other hand, ii) When a corresponding subframe is not the additional SRS prioritized subframe, UE may transmit other UL channel according to the existing LTE priority rule by prioritizing other UL channel over an additional SRS. Here, all symbols may be dropped for a non-prioritized channel (i.e., other UL channels excluding an UL channel transmitted among UL channels colliding in a corresponding subframe)(i.e., not transmitted in all allocated symbols).

The 'additional SRS prioritized subframe set' may be preconfigured through a higher layer (e.g., RRC) configuration and may be indicated/updated through lower layer signaling (e.g., a MAC CE or DCI) (e.g., a n-bit field). For example, additional SRS prioritized subframe set 1 to 5 may be preconfigured through RRC signaling and one or more sets of them may be indicated/added by lower layer signaling (a MAC CE or DCI). In addition, one or more specific sets of such indicated/added sets may be deleted.

Alternatively, for a more dynamic change of a priority rule, a separate field (e.g., a 1-bit field) may be configured in DCI that a base station triggers an additional SRS and whether an additional SRS triggered in corresponding DCI has higher priority over other UL channels may be indicated to UE by the field. For example, when the above-described separate 1-bit field of DCI indicates '1' when an additional SRS and other UL channel collide, UE may consider that an additional SRS is prioritized over other UL channels in a corresponding subframe that an additional SRS is triggered and UE may transmit an additional SRS. Conversely, when the 1-bit field indicates '0', UE may consider that other UL channels are prioritized over an additional SRS in a corresponding subframe that an additional SRS is triggered and UE may transmit other UL channel.

For an operation between a base station and a terminal, the above-described proposal 1 or proposal 2 may be independently applied and in addition, may be applied by a combination of proposal 1 and proposal 2.

In addition, a proposal of the above-described method 2 (i.e., proposal 1 and 2) may be also applied to an intra-band CA or intra-band CA situation without being limited to 1 component carrier (CC) or 1 band.

Also in NR MIMO Rel-17, an additional (or enhanced) SRS supporting more symbols may be defined for a NR legacy SRS (i.e., up to 4 symbols in one SRS resource may be configured in last 6 symbols in one slot.) as in LTE MIMO Rel-16.

In reference to a Rel-17 NR MIMO (FeMIMO) discussion for SRS enhancement, SRS enhancement targeted for both FR1 and FR2:

a. identifies and specifies enhancement in aperiodic SRS triggering to enable more flexible triggering and/or DCI overhead/usage decrease.

b. specifies SRS switching up to 8 antennas (e.g., xTyR, x={1, 2, 4} and y={6, 8}).

c. evaluates the following mechanism(s) and if necessary, specifies them to enhance SRS capacity and/or coverage: SRS time bundling, increased SRS repetitions, partial sounding across a frequency As such, in order to enhance capacity and coverage of a NR SRS, it is expected that multi-symbol SRSs exceeding 4 symbols will be supported in a time domain space/resource other than last 6 symbols in one slot. In this case, for a (Rel-17) additional (or enhanced) SRS, for a specific UL slot, a case may occur in which transmission timing of a SRS collides with transmission timing of an UL channel (e.g., a PUCCH, a PUSCH, a PRACH (physical random access channel), etc.) at a symbol level, and in this case, ambiguity may occur in a terminal operation.

Based on such a background, proposal 1 and proposal 2 of the method 2 are additionally proposed (hereinafter, proposal 1', proposal 2'). In this method, TDD, a system mainly targeted in NR, is considered. When a terminal is configured/indicated to transmit a (Rel-17 NR) additional (or enhanced) SRS, an operation is proposed that a terminal transmits a SRS by delaying/shifting a SRS to an uplink slot which may transmit a SRS. For example, an aperiodic SRS may be delayed/shifted to an uplink slot which may transmit a SRS regardless of a slot offset configured in a corresponding SRS resource set. In addition, an aperiodic SRS may be delayed/shifted to an uplink slot which may transmit a SRS although a slot after a slot offset configured in a corresponding SRS resource set from a triggered occasion is not an UL slot.

When a SRS is delayed/shifted, it means SRS transmission is delayed. In other words, if a SRS scheduled to be transmitted in slot n is delayed/shifted to slot n+x, the SRS may be transmitted in slot n+x, not in slot n.

Specifically, methods for preventing collision between a (Rel-17 NR) additional SRS and other UL channel and resolving ambiguity in an UE operation are proposed across proposal 1' and proposal 2'.

Proposal 1': Regardless of a slot offset configured in a (aperiodic) SRS resource set configured by a base station or although a slot after a slot offset from a triggered occasion is not an UL slot, SRS transmission may be delayed/shifted to an uplink slot that a terminal may transmit a SRS.

Here, a slot offset may be configured per SRS resource set or per SRS resource. In addition, a slot offset may be configured by higher layer signaling (e.g., RRC signaling) and may be also configured by lower layer signaling (e.g., a MAC CE or DCI). In addition, one or more slot offset candidate values may be preconfigured by higher layer signaling and a specific value of the one or more slot offset candidate values may be indicated by lower layer signaling. Here, one or more slot offset candidate values may be preconfigured per SRS resource set or per SRS resource by higher layer signaling.

A slot offset may mean spacing from an occasion that SRS transmission is triggered by DCI (i.e., an occasion that DCI is received) to a transmission occasion of a SRS. In addition, a slot offset may mean slot spacing from a slot that SRS transmission is triggered by DCI (i.e., a slot that DCI is received) to a transmission slot of a SRS. For example, if a slot that SRS transmission is triggered by DCI is slot n and a slot offset is 4, a SRS may be transmitted in slot n+4.

Proposal 1'-1: When a base station triggers a (Rel-17 NR) additional SRS resource set to UE through DCI format 1_1 (DL scheduling DCI), UE may operate as follows.

PDSCH transmission is scheduled by DCI, so collision with a SR may not be considered. When additional SRS transmission is triggered through DCI format 1_1 in slot n, UE may determine slot n+(slot offset) or the earliest UL slot after slot n+(slot offset) as an actual additional SRS transmission slot and transmit a SRS in a corresponding determined slot. Here, the earliest UL slot may correspond to the earliest slot determined in a time domain and the earliest UL slot after slot n+(slot offset) may mean an UL slot having the smallest slot index after slot n+(slot offset).

Proposal 1'-2: When a base station triggers a (Rel-17 NR) additional SRS resource set to UE through DCI format 0_1 (UL scheduling DCI), UE may operate as follows.

When additional SRS transmission is triggered through DCI format 0_1 in slot n, UE may determine SRS transmission timing by the following option and transmit a SRS at determined timing.

Option 1) A case is described in which a SRS is triggered without PUSCH scheduling. In this case, PUSCH transmission is not scheduled, so collision with a SRS may not be considered. For example, when a SRS is triggered without PUSCH scheduling, it may correspond to a case in which an UL-SCH indicator of corresponding DCI format 0_1 is '0' and a SRS request is 'non zero'.

When additional SRS transmission is triggered through corresponding DCI format 0_1 in slot n, UE may determine slot n+(slot offset) or the earliest UL slot after slot n+(slot offset) as an actual additional SRS transmission slot and transmit a SRS in a corresponding determined slot.

Option 2-1) When a PUSCH and a SRS are scheduled at the same time (when UE is scheduled to transmit a transport block by DCI and SRS transmission is triggered), PUSCH transmission is scheduled, so collision between a PUSCH and a SRS needs to be considered. For example, when a PUSCH and a SRS are scheduled at the same time, it may correspond to a case in which an UL-SCH indicator of corresponding DCI format 0_1 is '1' and a SRS request is 'non zero'.

If a PUSCH transmission UL slot by slot offset (K_2) of a PUSCH (slot offset K_2 of a PUSCH may mean spacing (slot spacing) from an occasion (a slot) that DCI scheduling a PUSCH is transmitted/received to a transmission occasion (slot) of a PUSCH) is not the same as an UL slot which will transmit a SRS according to the above-described option 1, a terminal may transmit a PUSCH and a SRS in each transmission slot. In other words, it corresponds to a case in which a corresponding PUSCH and SRS do not collide, so they may be transmitted respectively in a different slot.

Option 2-2) When a PUSCH and a SRS are scheduled at the same time (when UE is scheduled to transmit a transport block by DCI and SRS transmission is triggered), PUSCH transmission is scheduled, so collision between a PUSCH and a SRS needs to be considered. For example, when a PUSCH and a SRS are scheduled at the same time, it may correspond to a case in which an UL-SCH indicator of corresponding DCI format 0_1 is '1' and a SRS request is 'non zero'.

If a PUSCH transmission UL slot by slot offset (K_2) of a PUSCH is the same as an UL slot to be transmitted according to the above-described option 1, but a PUSCH and a SRS are not overlapped at a symbol level in a corresponding slot, a terminal may transmit both a PUSCH and a SRS in a corresponding slot. Here, not being overlapped at a symbol level means that any one symbol is not overlapped between transmission symbol(s) of a PUSCH and transmission symbol(s) of a SRS. In other words, a corresponding PUSCH and SRS are not transmitted in the same slot, but do not collide with each other at a symbol level, so they may be transmitted in the same slot.

Option 2-3) When a PUSCH and a SRS are scheduled at the same time (when UE is scheduled to transmit a transport block by DCI and SRS transmission is triggered), PUSCH transmission is scheduled, so collision between a PUSCH and a SRS needs to be considered. For example, when a PUSCH and a SRS are scheduled at the same time, it may correspond to a case in which an UL-SCH indicator of corresponding DCI format 0_1 is '1' and a SRS request is 'non zero'.

If a PUSCH transmission UL slot by slot offset (K_2) of a PUSCH is the same as an UL slot to be transmitted according to the above-described option 1 and a PUSCH and a SRS are overlapped at a symbol level in a corresponding slot, a terminal may transmit a PUSCH in a corresponding slot and a terminal may perform SRS transmission by shifting/delaying it in the next valid UL slot.

Subsequently, when a SRS collides again with (another) PUSCH in a corresponding valid UL slot, a terminal may transmit a SRS in the next valid UL slot by shifting/delaying SRS transmission again by considering low priority of a SRS. But, for a SRS shift/delay operation of a terminal, the total number of shift/delay may be limited to i (e.g., i=5) to prevent error propagation. And, if a corresponding limit is exceeded, a terminal may drop a SRS. Alternatively, when a window (a time duration) that a SRS is shifted/delayed is limited like t [ms] or k slots (e.g., t=20, k=20) from n, an occasion that DCI arrives, and a corresponding window is passed (exceeded), a terminal may drop a SRS.

As such, the maximum number that a SRS may be shifted/delayed and/or a window that a SRS may be shifted/delayed may be configured to a terminal by higher layer signaling (e.g., RRC signaling) or dynamic signaling (e.g., a MAC CE or DCI). In addition, the maximum number that a SRS may be shifted/delayed and/or a window (or a time duration) that a SRS may be shifted/delayed may be configured per SRS resource set or per SRS resource.

Alternatively, a terminal may transmit only the remaining symbols except for overlapped symbol(s) for a corresponding SRS. In other words, a terminal may transmit a SRS in the remaining symbol(s) except for symbol(s) overlapped with the PUSCH among symbols(s) allocated by SRS transmission.

Alternatively, SRS transmission itself may be dropped. In other words, although SRS transmission is triggered by DCI, a terminal may not perform corresponding SRS transmission.

Proposal 2': A base station may configure/indicate 'an additional SRS prioritized slot (or slot set)' to a terminal. And, additional SRS transmission timing of subsequent UE after the configuration/indication may follow timing of proposal 1' of the above-described method 2. And, when a corresponding additional SRS collides with other UL channel (e.g., a PUCCH, a PUSCH, a PRACH, a SRS for other cell) at a symbol level in the same slot within one cell, UE may determine whether to prioritize an additional SRS according to whether a corresponding SRS transmission slot is a slot configured to prioritize SRS transmission (i.e., the additional SRS prioritized slot).

In other words, when an additional SRS and other UL channel collide in the same slot, UE 1) may transmit an additional SRS in the same slot by prioritizing an additional SRS when a corresponding slot is the additional SRS prioritized slot. But, an additional SRS is not always prioritized over all UL channels and priority may be determined according to 'a priority rule' according to the present disclosure described after. On the other hand, 2) when a corresponding slot is not the additional SRS prioritized slot, a terminal may transmit other UL channel according to the existing NR priority rule by prioritizing other UL channels in the same slot.

Here, all symbols may be dropped for a non-prioritized UL channel (i.e., other UL channels excluding an UL channel transmitted among UL channels colliding in a corresponding slot). In other words, a non-prioritized UL channel may not be transmitted in all symbols within a corresponding slot.

Alternatively, a non-prioritized UL channel may be transmitted only in the remaining symbols except for overlapped symbols in a corresponding slot.

As an example of 'a priority rule' according to the present disclosure, a SRS has higher priority only over a PUSCH and for other UL channel (e.g., a PUCCH, a PRACH, etc.), a corresponding UL channel may have higher priority over a SRS. Specifically, by considering that other UL channels other than a SRS are a channel which plays a more important role than a SRS, a terminal may preferentially transmit a PRACH and a PUCCH when a PRACH/a PUCCH and an additional SRS collide in the slot in the 'additional SRS prioritized slot set'. In addition, when a PUSCH and an additional SRS collide, it is possible to achieve an effect of SRS capacity/coverage enhancement through transmission of multi-symbol SRSs exceeding 4 symbols by preferentially transmitting a SRS.

As another example, the 'priority rule' according to the present disclosure may be determined based on contents of an UL channel colliding with a SRS. Specifically, a terminal may transmit an additional SRS in preference to a PUCCH and/or a PUSCH in the 'additional SRS prioritized slot set'. Here, it may be configured to prioritize an additional SRS over a PUCCH and/or a PUSCH for CSI reporting carrying relatively less important information according to contents of a PUSCH/a PUCCH. For example, when an additional SRS and a PUCCH and/or a PUSCH carrying ACK/NACK collide in the slot, a terminal may drop a SRS. On the other hand, when an additional SRS and a PUCCH and/or a PUSCH carrying CSI reporting information collide, a terminal may drop a PUCCH and/or a PUSCH. Here, a terminal may drop transmission of a corresponding UL channel in all symbols for a non-prioritized channel. Alternatively, a terminal may transmit a corresponding UL channel only in the remaining symbols except for overlapped symbols in a non-prioritized channel.

As another example, in 'a priority rule' according to the present disclosure, only a SRS with specific usage may have higher priority over other UL channel. This embodiment may be combined with any one of the above-described 2 embodiments and may be applied as a precondition for an additional SRS to have priority over other UL channel. Specifically, only an aperiodic SRS transmitted by a terminal according to a dynamic indication of a base station (e.g., gNB) or only a SRS with specific usage may have higher priority over other UL channel. For example, only when transmission of a (aperiodic) SRS resource belonging to a (aperiodic) SRS resource set with 'codebook' or 'non-codebook' usage playing an important role in UL link adaptation is configured/indicated, a SRS may be prioritized over other UL channel. Alternatively, only when transmission of a (aperiodic) SRS resource belonging to a (aperiodic) SRS resource set with 'antenna switching' usage to obtain DL channel information by using reciprocity is configured/indicated, a SRS may be prioritized over other UL channel.

The above-described operation may become a standard for an operation between a base station and a terminal by being predefined in a form of a priority rule regardless of a configuration/an indication of 'an additional SRS prioritized slot set'.

A slot (set) configured to prioritize SRS transmission (i.e., 'the additional SRS prioritized slot set') may be preconfigured through a higher layer (e.g., RRC) configuration and may be indicated/updated through a MAC CE or DCI (e.g., a n-bit field). Alternatively, for a more dynamic change of a priority rule, a separate 1-bit field may be configured for DCI that a base station triggers an additional SRS and whether to have higher priority over other UL channels may be configured to UE for an additional SRS triggered by corresponding DCI through a 1-bit field. For example, when an additional SRS and other UL channel collide, UE may transmit an additional SRS in preference to other UL channels in a corresponding slot that an additional SRS is triggered (i.e., a slot determined according to proposal 1' of the method 2) if the above-described separate 1-bit field of DCI is '1'. Conversely, if the 1-bit field is '0', UE may transmit other UL channel by considering that other UL channels are prioritized over an additional SRS in a corresponding slot that an additional SRS is triggered (i.e., a slot determined according to proposal 1' of the method 2).

For an operation between a base station and a terminal, proposal 1' or proposal 2' of the method 2 may be independently applied and in addition, may be also applied by a combination of proposal 1' and proposal 2'.

In addition, proposal 1' or proposal 2' of method 2 may be also applied to an intra-band CA or intra-band CA situation without being limited to 1 CC or 1 band.

For the above-described proposal 1 and proposal 2 (and/or proposal 1' and proposal 2'), subframe(s) that an additional SRS may be transmitted or that an additional SRS is prioritized may be configured by preconfiguring subframe(s) which may transmit an additional SRS and subframe(s) prioritizing an additional SRS. Accordingly, in an UE operation, there is an effect of defining transmission timing of an additional SRS, preventing collision between an additional SRS and other UL channel and resolving ambiguity.

Hereinafter, an SRS transmission/reception method in a wireless communication system supporting a flexible slot will be described.

The 'reference signal (RS)' referred to in the present disclosure is a physical layer signal/channel such as a synchronization signal and/or a PBCH/SS block as well as various types of RSs specified in the standard.

In addition, the 'DL channel/RS' referred to in the present disclosure may include a PDCCH, a PDSCH, a CSI-RS, a PBCH/SS block, etc. In addition, the 'UL channel/RS' may include a PUSCH, a PUCCH, a PRACH, an SRS, etc.

Figure 8:
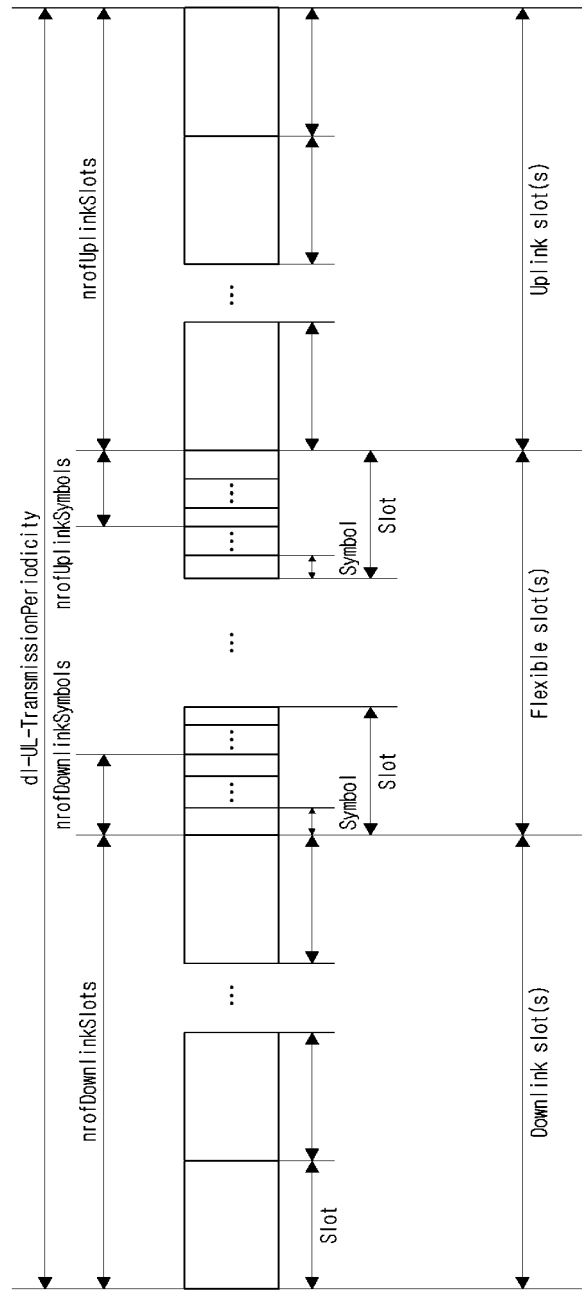
FIG. 8 is a diagram illustrating an uplink downlink TDD configuration in a wireless communication system to which the present disclosure may be applied.

FIG. 8 is a diagram illustrating an uplink downlink TDD configuration in a wireless communication system to which the present disclosure may be applied.

Referring to FIG. 8, a "downlink slot (DL slot)" refers to a slot configured by a higher layer parameter (i.e., RRC parameter: 'nrofDownlinkSlots') for the number of consecutive DL slots from the start of each DL-UL pattern in a higher layer IE (i.e., RRC IE: 'TDD-UL-DL-Pattern' IE) for a TDD pattern of an uplink-downlink of a higher layer configuration (information element (IE)) (i.e., RRC IE: 'TDD-UL-DL-ConfigCommon') for determining a cell-specific UL/DL TDD configuration. An "uplink slot (UL slot)" refers to a slot configured by a higher layer parameter (i.e., RRC parameter: 'nrofUplinkSlots') for the number of consecutive UL slots from the start of each DL-UL pattern in a higher layer IE (i.e., RRC IE: 'TDD-UL-DL-Pattern' IE) for a TDD pattern of an uplink-downlink of a higher layer configuration (IE) (i.e., RRC IE: 'TDD-UL-DL-ConfigCommon') for determining a cell-specific UL/DL TDD configuration. A "flexible slot" refers to other slot (i.e., a slot that are neither a DL slot nor a UL slot). Here, a periodicity of a DL-UL pattern is configured by the 'dl-UL-TransmissionPeriodicity' parameter in the 'TDD-UL-DL-Pattern' IE.

In the slot following (next to) the last "DL slot" among slots configured by 'nrofDownlinkSlots', the number of partial-downlink symbols is configured by an uplink parameter (i.e., 'nrofDownlinkSymbols' parameter). That is, the 'nrofDownlinkSymbols' parameter indicates the number of consecutive DL symbols from the start (in the first part) of the (next) slot following the last DL slot among DL slots configured by 'nrofDownlinkSlots'. In the (earlier) slot preceding the first "UL slot" among slots configured by 'nrofUplinkSlots', the number of partial-uplink symbols is configured by an uplink parameter (i.e., 'nrofUplinkSymbols' parameter). That is, the 'nrofUplinkSymbols' parameter indicates the number of consecutive UL symbols from the end of the (earlier) slot preceding the first "UL slot" among UL slots configured by 'nrofUplinkSlots'.

Hereinafter, an UL/DL TDD configuration (tdd-UL-DL-Configuration) and a method of configuring/indicating a symbol in a flexible slot will be described.

By receiving the 'tdd-UL-DL-ConfigurationCommon' configuration from a base station, a terminal may configure the number of DL slots, the number of UL slots, and the number of flexible slots among slots in a periodicity of a DL-UL pattern. Additionally, by receiving the 'tdd-UL-DL-ConfigurationDedicated' configuration for a terminal-specific UL/DL TDD configuration, a terminal may obtain information on the number of 'downlink' symbols, the number of 'uplink' symbols, and the number of 'flexible' symbols in a (flexible) slot with a specific slot index. In other words, when a terminal is additionally provided with the 'tdd-UL-DL-ConfigurationDedicated', the 'tdd-UL-DL-ConfigurationDedicated' parameter overrides only flexible symbols per slot for the number of slots provided by 'tdd-UL-DLConfigurationCommon'.

Hereinafter, the slot configuration of TS 38.213 section 11.1 will be described.

The tdd-UL-DL-ConfigurationDedicated configuration provides the following.

A set of slot configurations by the 'slotSpecificConfigurationsToAddModList' parameter For each slot configuration from the set of slot configurations, a slot index for a slot provided by the 'slotIndex' parameter A set of symbols for a slot by the 'symbols' parameter is as follows.

If 'symbols'='allDownlink', all symbols in the slot (i.e., slot identified by slot index) are downlink.

If 'symbols'='allUplink', all symbols in the slot i.e., slot identified by slot index) are uplink.

If 'symbols'='explicit', the 'nrofDownlinkSymbols' parameter provides the number of downlink first symbols in the slot and the 'nrofUplinkSymbols' parameter provides the number of uplink last symbols in the slot. If the 'nrofDownlinkSymbols' parameter is not provided, there are no downlink first symbols in the slot and if the 'nrofUplinkSymbols' parameter is not provided, there are no uplink last symbols in the slot. The remaining symbols in the slot are flexible.

For each slot having a corresponding index provided by the 'slotIndex' parameter, a UE applies a format provided by a corresponding 'symbols' parameter. A UE does not expect the 'tdd-UL-DL-ConfigurationDedicated' configuration to indicate as uplink or as downlink a symbol that the 'tdd-UL-DL-ConfigurationCommon' configuration indicates as a downlink or as an uplink symbol, respectively.

For each slot configuration provided by the 'tdd-UL-DL-ConfigurationDedicated' configuration, a reference subcarrier spacing (SCS) configuration is the reference SCS configuration ref) provided by the 'tdd-UL-DL-ConfigurationCommon' configuration.

A slot configuration period and the number of downlink symbols, uplink symbols, and flexible symbols in each slot of the slot configuration period are determined from the 'tdd-UL-DL-ConfigurationCommon' configuration and the 'tdd-UL-DL-ConfigurationDedicated' configuration and are common to each configured BWP.

A UE considers symbols in a slot indicated as downlink by the 'tdd-UL-DL-ConfigurationCommon' configuration, or the 'tdd-UL-DL-ConfigurationDedicated' configuration to be available for receptions and considers symbols in a slot indicated as uplink by the 'tdd-UL-DL-ConfigurationCommon' parameter, or by the 'tdd-UL-DL-ConfigurationDedicated' parameter to be available for transmissions.

If a UE is not configured to monitor a PDCCH for DCI format 2_0, for a set of symbols of a slot that are indicated as flexible by the 'tdd-UL-DL-ConfigurationCommon' configuration and the 'tdd-UL-DL-ConfigurationDedicated' configuration (if provided), or when the 'tdd-UL-DL-ConfigurationCommon' configuration and the 'tdd-UL-DL-ConfigurationDedicated' configuration are not provided to the UE:

the UE receives a PDSCH or a CSI-RS in the set of symbols of the slot if the UE receives a corresponding indication by a DCI format 1_0, DCI format 1_1, or DCI format 0_1; or
  the UE transmits a PUSCH, a PUCCH, a PRACH, or an SRS in the set of symbols of the slot if the UE receives a corresponding indication by a DCI format 0_0, DCI format 0_1, DCI format 1_0, DCI format 1_1, DCI format 2_3, or a random access response (RAR) UL grant.

For operation on a single carrier in unpaired spectrum, if a UE is configured by higher layers to receive a PDCCH, or a PDSCH, or a CSI-RS in a set of symbols of a slot, the UE receives the PDCCH, the PDSCH, or the CSI-RS if the UE does not detect a DCI format 0_0, DCI format 0_1, DCI format 1_0, DCI format 1_1, or DCI format 2_3 that indicates to the UE to transmit a PUSCH, a PUCCH, a PRACH, or a SRS in at least one symbol of the set of symbols of the slot; otherwise, the UE does not receive the PDCCH, or the PDSCH, or the CSI-RS in the set of symbols of the slot.

For operation on a single carrier in unpaired spectrum, if a UE is configured by higher layers to receive a PDCCH, a PDSCH, or a CSI-RS in a set of symbols of a slot and the UE detects a DCI format 1_0, DCI format 1_1, or DCI format 0_1 indicating to the UE to receive a CSI-RS or a PDSCH in a subset of symbols from the set of symbols, then, the UE does not expect to cancel the transmission in symbols from the set of symbols that occur, relative to a last symbol of a CORESET where the UE detects the DCI format 1_0 or the DCI format 1_1 or the DCI format 0_1, after the number of symbols that is smaller than the PUSCH preparation time ($T_{proc,2}$) Here, the PUSCH preparation time ($T_{proc,2}$) for the corresponding UE processing capability assuming that $d_{2,1}=1$ and p corresponds to the smallest SCS configuration between the SCS configuration of the PDCCH carrying the DCI format 1_0, DCI format 1_1 or DCI format 0_1 and the SCS configuration of the SRS, PUCCH, PUSCH or $\mu_r$ is used. In addition, $\mu_r$ corresponds to the SCS configuration of the PRACH if it is 15 kHz or higher; otherwise $\mu_r=0$.
  the UE cancels the PUCCH, PUSCH, or PRACH transmission in remaining symbols from the set of symbols and cancels the SRS transmission in remaining symbols from the subset of symbols.

For a set of symbols of a slot that are indicated to a UE as uplink by the 'tdd-UL-DL-ConfigurationCommon' configuration, or the 'tdd-UL-DL-ConfigurationDedicated' configuration, the UE does not receive PDCCH, PDSCH, or CSI-RS when the PDCCH, PDSCH, or CSI-RS overlaps, even partially, with the set of symbols of the slot.

For a set of symbols of a slot that are indicated to a UE as downlink by the 'tdd-UL-DL-ConfigurationCommon' configuration, or the 'tdd-UL-DL-ConfigurationDedicated' configuration, the UE does not transmit PUSCH, PUCCH, PRACH, or SRS when the PUSCH, PUCCH, PRACH, or SRS overlaps, even partially, with the set of symbols of the slot.

For a set of symbols of a slot that are indicated to a UE as flexible by the 'tdd-UL-DL-ConfigurationCommon' configuration, and the 'tdd-UL-DL-ConfigurationDedicated' configuration (if provided), the UE does not expect to receive both dedicated higher layer parameters configuring transmission from the UE in the set of symbols of the slot and dedicated higher layer parameters configuring reception by the UE in the set of symbols of the slot.

For operation on a single carrier in unpaired spectrum, for a set of symbols of a slot indicated to a UE by 'ssb-PositionsInBurst' in system information block type1 (SIB1) or the parameter 'ssb-PositionsInBurst' for an SSB position in the common configuration 'ServingCellConfigCommon' of a serving cell, for reception of SS/PBCH blocks, the UE does not transmit PUSCH, PUCCH, PRACH in the slot if a transmission would overlap with any symbol from the set of symbols and the UE does not transmit SRS in the set of symbols of the slot. The UE does not expect the set of symbols of the slot to be indicated as uplink by the 'tdd-UL-DL-ConfigurationCommon' configuration, or the 'tdd-UL-DL-ConfigurationDedicated' configuration, when provided to the UE.

For a set of symbols of a slot corresponding to a valid PRACH occasion and $N_{gap}$ symbols before the valid PRACH occasion, the UE does not receive PDCCH, PDSCH, or CSI-RS in the slot if a reception would overlap with any symbol from the set of symbols. The UE does not expect the set of symbols of the slot to be indicated as downlink by the 'tdd-UL-DL-ConfigurationCommon' configuration or the 'tdd-UL-DL-ConfigurationDedicated' configuration.

For a set of symbols of a slot indicated to a UE by the configuration 'pdcch-ConfigSIB1' for a PDCCH configuration in master information block (MIB) for a CORESET for Type0-PDCCH common search space (CSS) set, the UE does not expect the set of symbols to be indicated as uplink by the 'tdd-UL-DL-ConfigurationCommon' configuration, or the 'tdd-UL-DL-ConfigurationDedicated' configuration.

If a UE is scheduled by a DCI format 1_1 to receive PDSCH over multiple slots, and if the 'tdd-UL-DL-ConfigurationCommon' configuration, or the 'tdd-UL-DL-ConfigurationDedicated' configuration, indicate that, for a slot from the multiple slots, at least one symbol from a set of symbols where the UE is scheduled PDSCH reception in the slot is an uplink symbol, the UE does not receive the PDSCH in the slot.

If a UE is scheduled by a DCI format 0_1 to transmit PUSCH over multiple slots, and if the 'tdd-UL-DL-ConfigurationCommon' configuration, or the 'tdd-UL-DL-ConfigurationDedicated' configuration, indicates that, for a slot from the multiple slots, at least one symbol from a set of symbols where the UE is scheduled PUSCH transmission in the slot is a downlink symbol, the UE does not transmit the PUSCH in the slot.

According to the above-mentioned standard specification, in a set of symbols of a slot indicated to a UE as uplink by the DL-ConfigurationCommon configuration or the tdd-UL-DL-ConfigurationDedicated configuration, a UE does not receive a downlink channel/RS. In addition, in a set of symbols of a slot indicated to a UE as downlink by the DL-ConfigurationCommon configuration or the tdd-UL-DL-ConfigurationDedicated configuration, a UE does not transmit an uplink channel/RS. In addition, in a set of symbols of a slot indicated to a UE as flexible by the DL-ConfigurationCommon configuration or the tdd-UL-DL-ConfigurationDedicated configuration, a UE does not expect any transmission/reception by a dedicated higher layer parameter.

A terminal receives a candidate configuration capable of detecting DCI format 2_0 carrying a slot format indicator (SFI) through a search space configuration that is an RRC configuration. In addition, in a specific slot (e.g., flexible slot) according to the corresponding configuration, a terminal may decode DCI format 2_0, and may obtain information on the number of 'downlink', 'uplink', and 'flexible' symbols in the slot.

Hereinafter, the UE procedure for determining the slot format of TS 38.213 section 11.1.1 will be described.

For a set of symbols of a slot, a UE does not expect to detect a DCI format 2_0 with an SFI-index field value indicating the set of symbols of the slot as uplink and to detect a DCI format 1_0, a DCI format 1_1, or DCI format 0_1 indicating to the UE to receive PDSCH or CSI-RS in the set of symbols of the slot.

For a set of symbols of a slot, a UE does not expect to detect a DCI format 2_0 with an SFI-index field value indicating the set of symbols in the slot as downlink and to detect a DCI format 0_0, DCI format 0_1, DCI format 1_0, DCI format 1_1, DCI format 2_3, or a RAR UL grant indicating to the UE to transmit PUSCH, PUCCH, PRACH, or SRS in the set of symbols of the slot.

For a set of symbols of a slot that are indicated as downlink/uplink by the 'tdd-UL-DL-ConfigurationCommon' configuration, or the 'tdd-UL-DL-ConfigurationDedicated' configuration, the UE does not expect to detect a DCI format 2_0 with an SFI-index field value indicating the set of symbols of the slot as uplink/downlink, respectively.

For a set of symbols of a slot corresponding to SS/PBCH blocks with indexes indicated to a UE by 'ssb-PositionsInBurst' in system information block type 1 (SIB1), or by a parameter 'ssb-PositionsInBurst' for an SSB position in a common configuration 'ServingCellConfigCommon' for a serving cell, the UE does not expect to detect a DCI format 2_0 with an SFI-index field value indicating the set of symbols of the slot as uplink.

For a set of symbols of a slot corresponding to a valid PRACH occasion and $N_{gap}$ symbols before the valid PRACH occasion, the UE does not expect to detect a DCI format 2_0 with an SFI-index field value indicating the set of symbols of the slot as downlink.

For a set of symbols of a slot indicated to a UE by the 'pdcch-ConfigSIB1' configuration for a PDCCH configuration in MIB for a CORESET for Type0-PDCCH CSS set, the UE does not expect to detect a DCI format 2_0 with an SFI-index field value indicating the set of symbols of the slot as uplink.

For a set of symbols of a slot indicated to a UE as flexible by the 'tdd-UL-DL-ConfigurationCommon' configuration and the 'tdd-UL-DL-ConfigurationDedicated' configuration (if provided), or when the 'tdd-UL-DL-ConfigurationCommon' configuration and the 'tdd-UL-DL-ConfigurationDedicated' configuration are not provided to the UE, and if the UE detects a DCI format 2_0 providing a format for the slot using a slot format value other than 255, If one or more symbols from the set of symbols are symbols in a CORESET configured to the UE for PDCCH monitoring, the UE receives PDCCH in the CORESET only if an SFI-index field value in DCI format 2_0 indicates that the one or more symbols are downlink symbols.

If an SFI-index field value in DCI format 2_0 indicates the set of symbols of the slot as flexible and the UE detects a DCI format 1_0, DCI format 1_1, or DCI format 0_1 indicating to the UE to receive PDSCH or CSI-RS in the set of symbols of the slot, the UE receives PDSCH or CSI-RS in the set of symbols of the slot.

If an SFI-index field value in DCI format 2_0 indicates the set of symbols of the slot as flexible and the UE detects a DCI format 0_0, DCI format 0_1, DCI format 1_0, DCI format 1_1, DCI format 2_3, or a RAR UL grant indicating to the UE to transmit PUSCH, PUCCH, PRACH, or SRS in the set of symbols of the slot the UE transmits the PUSCH, PUCCH, PRACH, or SRS in the set of symbols of the slot If an SFI-index field value in DCI format 2_0 indicates the set of symbols of the slot as flexible, and the UE does not detect a DCI format 1_0, DCI format 1_1, or DCI format 0_1 indicating to the UE to receive PDSCH or CSI-RS, or the UE does not detect a DCI format 0_0, DCI format 0_1, DCI format 1_0, DCI format 1_1, DCI format 2_3, or a RAR UL grant indicating to the UE to transmit PUSCH, PUCCH, PRACH, or SRS in the set of symbols of the slot, the UE does not transmit or receive in the set of symbols of the slot.

If the UE is configured by higher layers to receive PDSCH or CSI-RS in the set of symbols of the slot, the UE receives the PDSCH or the CSI-RS in the set of symbols of the slot only if an SFI-index field value in DCI format 2_0 indicates the set of symbols of the slot as downlink.

If the UE is configured by higher layers to transmit PUCCH, or PUSCH, or PRACH in the set of symbols of the slot, the UE transmits the PUCCH, or the PUSCH, or the PRACH in the slot only if an SFI-index field value in DCI format 2_0 indicates the set of symbols of the slot as uplink.

If the UE is configured by higher layers to transmit SRS in the set of symbols of the slot, the UE transmits the SRS only in a subset of symbols from the set of symbols of the slot indicated as uplink symbols by an SFI-index field value in DCI format 2_0.

A UE does not expect to detect an SFI-index field value in DCI format 2_0 indicating the set of symbols of the slot as downlink and also detect a DCI format 0_0, DCI format 0_1, DCI format 1_0, DCI format 1_1, DCI format 2_3, or a RAR UL grant indicating to the UE to transmit SRS, PUSCH, PUCCH, or PRACH, in one or more symbols from the set of symbols of the slot.

A UE does not expect to detect an SFI-index field value in DCI format 2_0 indicating the set of symbols of the slot as downlink or flexible if the set of symbols of the slot includes symbols corresponding to any repetition of a PUSCH transmission activated by an UL Type 2 grant PDCCH.

A UE does not expect to detect an SFI-index field value in DCI format 2_0 indicating the set of symbols of the slot as uplink and also detect a DCI format 1_0 or DCI format 1_1 or DCI format 0_1 indicating to the UE to receive PDSCH or CSI-RS in one or more symbols from the set of symbols of the slot.

If a UE is configured by higher layers to receive a CSI-RS or a PDSCH in a set of symbols of a slot and the UE detects a DCI format 2_0 with a slot format value other than 255 that indicates a slot format with a subset of symbols from the set of symbols as uplink or flexible, or the UE detects a DCI format 0_0, DCI format 0_1, DCI format 1_0, DCI format 1_1, or DCI format 2_3 indicating to the UE to transmit PUSCH, PUCCH, SRS, or PRACH in at least one symbol in the set of the symbols, the UE cancels the CSI-RS reception in the set of symbols of the slot or cancels the PDSCH reception in the slot.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format 1_0, DCI format 1_1, or DCI format 0_1 indicating to the UE to receive CSI-RS or PDSCH in a subset of symbols from the set of symbols, then, The UE does not expect to cancel the transmission in symbols from the set of symbols that occur, relative to a last symbol of a CORESET where the UE detects the DCI format 2_0 or the DCI format 1_0 or the DCI format 1_1 or the DCI format 0_1, after a number of symbols that is smaller than the PUSCH preparation time ($T_{proc,2}$). Here, the PUSCH preparation time ($T_{proc,2}$) for the corresponding UE processing capability assuming that $d_{2,1}=1$ and $\mu$ corresponds to the smallest SCS configuration between the SCS configuration of the PDCCH carrying the DCI format 2_0, DCI format 1_0, DCI format 1_1 or DCI format 0_1 and the SCS configuration of the SRS, PUCCH, PUSCH or $\mu_r$ is used. In addition, $\mu_r$ corresponds to the SCS configuration of the PRACH if it is 15 kHz or higher; otherwise $\mu_r=0$.

The UE cancels the PUCCH, or PUSCH, or PRACH transmission in remaining symbols from the set of symbols and cancels the SRS transmission in remaining symbols from the subset of symbols.

A UE assumes that flexible symbols in a CORESET configured to the UE for PDCCH monitoring are downlink symbols if the UE does not detect an SFI-index field value in DCI format 2_0 indicating the set of symbols of the slot as flexible or uplink and the UE does not detect a DCI format 0_0, DCI format 0_1, DCI format 1_0, DCI format 1_1, or DCI format 2_3 indicating to the UE to transmit SRS, PUSCH, PUCCH, or PRACH in the set of symbols.

For a set of symbols of a slot that are indicated as flexible by the 'tdd-UL-DL-ConfigurationCommon' configuration, and the 'tdd-UL-DL-ConfigurationDedicated' configuration (if provided), or when the 'tdd-UL-DL-ConfigurationCommon' configuration, and the 'tdd-UL-DL-ConfigurationDedicated' configuration are not provided to the UE, and if the UE does not detect a DCI format 2_0 providing a slot format for the slot, The UE receives PDSCH or CSI-RS in the set of symbols of the slot if the UE receives a corresponding indication by a DCI format 1_0, DCI format 1_1, or DCI format 0_1.

The UE transmits PUSCH, PUCCH, PRACH, or SRS in the set of symbols of the slot if the UE receives a corresponding indication by a DCI format 0_0, DCI format 0_1, DCI format 1_0, DCI format 1_1, DCI format 2_3, or a RAR UL grant.

The UE receives PDCCH as described in Clause 10.1.

If the UE is configured by higher layers to receive PDSCH or CSI-RS in the set of symbols of the slot, the UE does not receive the PDSCH or the CSI-RS in the set of symbols of the slot.

If the UE is configured by higher layers to transmit SRS, or PUCCH, or PUSCH, or PRACH in the set of symbols of the slot and the UE is not provided a configuration for an uplink (i.e., 'EnableConfiguredUL-r16' configuration), A UE does not transmit the PUCCH, or the PUSCH, or the PRACH in the slot and does not transmit the SRS in symbols from the set of symbols in the slot, if any, starting from a symbol that is after PUSCH preparation time ($T_{proc,2}$) for the corresponding PUSCH timing capability assuming after a last symbol of a CORESET where the UE is configured to monitor PDCCH for DCI format 2_0. Here, $\mu$ corresponds to the smallest SCS configuration between the SCS configuration of the PDCCH carrying the DCI format 2_0 and the SCS configuration of the SRS, PUCCH, PUSCH or $\mu_r$. Here, $\mu_r$ corresponds to the SCS configuration of the PRACH if it is 15 kHz or higher; otherwise $\mu_r=0$.

A UE does not expect to cancel the transmission of the SRS, or the PUCCH, or the PUSCH, or the PRACH in symbols from the set of symbols in the slot, if any, starting before a symbol that is after the PUSCH preparation time ($T_{proc,2}$) for the corresponding PUSCH timing capability assuming $d_{2,1}=1$ after a last symbol of a CORESET where the UE is configured to monitor PDCCH for DCI format 2_0. Here, $\mu$ corresponds to the smallest SCS configuration between the SCS configuration of the PDCCH carrying the DCI format 2_0 and the SCS configuration of the SRS, PUCCH, PUSCH or $\mu_r$. Here, $\mu_r$ corresponds to the SCS configuration of the PRACH if it is 15 kHz or higher; otherwise $\mu_r=0$.

if the UE is configured by higher layers to transmit SRS, or PUCCH, or PUSCH, or PRACH in the set of symbols of the slot and the UE is provided a configuration for an uplink (i.e., 'EnableConfiguredUL-r16' configuration), the UE can transmit the SRS, or PUCCH, or PUSCH, or PRACH, respectively.

For unpaired spectrum operation for a UE on a cell in a frequency band of FR1, and when the scheduling restrictions due to radio resource management (RRM) measurements are not applicable, if the UE detects a DCI format 0_0, DCI format 0_1, DCI format 1_0, DCI format 1_1, or DCI format 2_3 indicating to the UE to transmit in a set of symbols, the UE is not required to perform RRM measurements based on a SS/PBCH block or CSI-RS reception on a different cell in the frequency band if the SS/PBCH block or CSI-RS reception includes at least one symbol from the set of symbols.

According to the above-described standard, in a set of symbols in a slot indicated as downlink/uplink configured by the 'DL-ConfigurationCommon' configuration or the 'tdd-UL-DL-ConfigurationDedicated' configuration, a terminal does not expect detection of DCI format 2_0 carrying an SFI-index field.

In addition, in a set of symbols in a slot indicated to a UE as flexible by the 'tdd-UL-DL-ConfigurationCommon' configuration and the 'tdd-UL-DL-ConfigurationDedicated' configuration (if provided), or when the 'tdd-UL-DL-ConfigurationCommon' configuration and the 'tdd-UL-DL-ConfigurationDedicated' configuration are not provided to a UE, a UE operates as follows. In a set of symbols in a slot indicated to a terminal as flexible configured/indicated by detection of DCI format 2_0, the terminal determines/considers that the set of symbols in the slot indicated by an SFI-index is flexible. Also, when transmission of a UL channel/RS is indicated in the set of symbols in the slot by UL DCI, a terminal transmits the corresponding UL channel/RS and When reception of a DL channel/RS is indicated in the set of symbols in the slot by DL DCI, a terminal receives the corresponding DL channel/RS. DL channel/RS transmission and UL channel/RS reception by higher layer signaling in the set of symbols in the slot are possible only when the set of symbols in the slot is configured as 'downlink' and 'uplink' by an SFI-index, respectively. In addition, transmission of an SRS by higher layer signaling in the set of symbols in the slot is possible only in a subset of uplink symbols indicated by an SFI-index field (by DCI format 2_0 detection). A terminal does not expect both detection of DCI format 2_0 carrying an SFI-index field indicating a set of symbols in a slot as downlink and detection of UL DCI indicating to transmit an UL channel/RS in one or more symbols of the set of symbols. In addition, a terminal does not expect both detection of DCI format 2_0 carrying an SFI-index indicating the set of symbols in the slot as uplink and detection of DL DCI indicating to receive a DL channel/RS in one or more symbols of the set of symbols.

A value of an SFI-index field in DCI format 2_0 indicates a slot format for each slot to a UE in in the number of slots for each DL BWP or each UL BWP starting from a slot in which the UE detects DCI format 2_0. A slot format is identified by a corresponding format index in Table 7 below.

Table 7 illustrates slot formats for a normal cyclic prefix (CP).

TABLE 7

| Format | \multicolumn{14}{c}{Symbol number in slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | F | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | F | F | U |
| 29 | D | D | D | D | D | D | D | D | D | D | F | F | F | U |
| 30 | D | D | D | D | D | D | D | D | D | F | F | F | F | U |
| 31 | D | D | D | D | D | D | D | D | D | D | F | F | U | U |
| 32 | D | D | D | D | D | D | D | D | D | F | F | F | U | U |
| 33 | D | D | D | D | D | D | D | D | F | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | F | F | U |
| 47 | D | D | F | U | U | U | U | D | D | F | U | U | U | U |
| 48 | D | F | U | U | U | U | U | D | F | U | U | U | U | U |
| 49 | D | D | D | F | F | U | D | D | D | D | F | F | U | U |
| 50 | D | D | F | F | U | U | D | D | F | F | U | U | U | U |
| 51 | D | F | U | U | U | U | D | F | U | U | U | U | U | U |
| 52 | D | F | F | F | F | U | D | F | F | F | F | U | U | U |
| 53 | D | D | F | F | F | U | D | D | F | F | F | U | U | U |
| 54 | F | F | F | F | F | F | D | D | D | D | D | D | D | D |
| 55 | D | D | F | F | U | U | U | D | D | D | D | D | D | D |
| 56-254 | \multicolumn{14}{c}{Reserved} | | | | | | | | | | | | | |
| 255 | \multicolumn{14}{c}{A UE determines a format of a slot based on tdd-UL-DL-ConfigurationCommon, or tdd-UL-DL-ConfigurationDedicated and detected DCI format (if any).} | | | | | | | | | | | | | |

In Table 7, 'D' denotes a downlink symbol, 'U' denotes an uplink symbol, and 'F' denotes a flexible symbol. Proposal 3: When configured/indicated for a terminal to transmit an (additional) SRS (e.g., aperiodic SRS), a terminal may transmit an (additional) SRS in a slot available for transmitting an SRS in consideration of the limited UL slot (e.g., uplink slot, flexible slot). In other words, by delaying/shifting SRS transmission until a slot available for transmitting (e.g., uplink slot, flexible slot), a terminal may transmit an SRS in the slot (e.g., uplink slot, flexible slot).

That is, a terminal may determine an SRS transmission slot (e.g., uplink slot, flexible slot) for SRS transmission and/or one or more SRS transmission symbols (e.g., uplink symbol, flexible symbol) in the corresponding slot.

Here, an (additional) SRS may be aperiodic SRS transmission. A terminal may receive configuration information for one or more SRS resource sets through higher layer signaling, and (additional) SRS transmission for one or more SRS resource sets in the configured one or more SRS resource sets may be triggered (or indicated) by DCI.

When a terminal determines an SRS transmission slot (e.g., uplink slot, flexible slot) and/or one or more SRS transmission symbols (e.g., uplink symbol, flexible symbol) in the corresponding slot for SRS transmission, regardless of a slot offset configured in an SRS resource set triggered by DCI, a terminal may determine an SRS transmission slot and/or one or more SRS transmission symbols in the corresponding slot. For example, a slot offset for an SRS resource set may be configured by higher layer signaling (e.g., RRC, MAC CE). In this case, when determining an SRS transmission slot in an SRS resource set triggered by DCI, the SRS transmission slot may not be a slot after a slot offset of the corresponding SRS resource set configured by higher layer signaling from the trigger DCI. For example, when the trigger DCI is transmitted/received in slot n and slot offset=4, an SRS transmission slot may not be slot n+4. That is, irrespective of slot n+4, the SRS transmission slot may be determined from among subsequent slots (e.g., uplink slot, flexible slot) in which SRS transmission is possible.

In addition, when a terminal determines an SRS transmission slot (e.g., uplink slot, flexible slot) and/or one or more SRS transmission symbols (e.g., uplink symbol, flexible symbol) in the corresponding slot for SRS transmission, even though a slot after a slot offset from a time/slot (e.g., time/slot at which DCI is received) at which an (additional) SRS is triggered is not a UL slot, a terminal may transmit an (additional) SRS in a slot (e.g., uplink slot, flexible slot) available for transmitting an SRS. For example, if a slot after a slot offset of a corresponding SRS resource set configured by higher layer signaling from the trigger DCI is a downlink slot, the SRS transmission slot may be determined from among slots (e.g., uplink slot, flexible slot) in which SRS transmission is possible after the downlink slot.

Here, when a SRS transmission slot/symbol after delay/shift (configured by the 'tdd-UL-DL-ConfigurationCommon' configuration and/or the 'tdd-UL-DL-Configuration-Dedicated' configuration) is a flexible slot (or flexible symbol), or when a slot after a slot offset is a UL slot but a symbol level position of the delayed/shifted (additional) SRS is (partially/completely) located in a flexible symbol other than an uplink symbol, an operation of a terminal and/or a base station will be described in the following proposals 3-1/3-2/3-3.

In this case, if a situation occurs in which a downlink/uplink/flexible symbol configuration for a corresponding flexible slot (flexible symbol) is not configured/indicated for a terminal, ambiguity in an operation of a terminal may occur. Alternatively, a downlink/uplink/flexible symbol configuration of a corresponding flexible slot (flexible symbol) is configured/indicated for a terminal, however in a situation where a symbol level position of the delayed/shifted additional SRS is not an uplink symbol but a downlink/flexible symbol or partially overlaps with a downlink/flexible symbol, ambiguity in an operation of a terminal may occur. Proposal 3 solves these problems.

Proposal 3-1: When a terminal does not recognize a downlink/uplink/flexible symbol configuration of a corresponding flexible slot (flexible symbol) (i.e., absence of the 'tdd-UL-DL-ConfigurationDedicated' configuration and/or absence of DCI format 2_0 detection), a terminal may transmit the delayed/shifted (additional) SRS in the corresponding flexible slot (flexible symbol).

Here, if a terminal is indicated to receive a DL channel/RS by DL DCI in a corresponding flexible slot (flexible symbol), or if a terminal is indicated to transmit a UL channel/RS by UL DCI/RAR UL grant in a corresponding flexible slot (flexible symbol), reception of a DL channel/RS or transmission of a UL channel/RS may collide (fully/partially) with the additional SRS at a symbol level. That is, when a transmission timing of an additional SRS and a transmission timing of a DL/UL channel/RS overlap in a symbol level domain, a terminal may operate according to at least one of the following options (i.e., examples). Here, DCI triggering an SRS and DCI indicating (scheduling) transmission/reception of a DL/UL channel/RS may be different DCIs. In addition, information indicating (scheduling) transmission/reception of a DL/UL channel/RS may be transmitted by higher layer signaling (e.g., RRC signaling or MAC CE).

Here, the collision/overlapping fully with an (additional) SRS at a symbol level may mean that all of one or more symbols in which an (additional) SRS is transmitted collide/overlap with reception of a DL channel/RS or transmission of a UL channel/RS. The collision/overlapping partially with an (additional) SRS at a symbol level may mean that a subset of symbols among one or more symbols in which an (additional) SRS is transmitted collide/overlap with reception of a DL channel/RS or transmission of a UL channel/RS. In addition, here, in consideration of a radio frequency (RF) retuning time from downlink to uplink, even after DL channel/RS reception, it may be considered that an (additional) SRS and a corresponding DL channel/RS collide during retuning time (i.e., n symbol(s)).

For convenience of description in the present disclosure, the determination of whether the collision/overlap is described based on a flexible slot (flexible symbol), however it is not limited thereto. Specifically, a region for determining whether the collision/overlapping occurs may include a region according to a retuning time after receiving the DL channel/RS in a corresponding flexible slot (flexible symbol) and the flexible slot (flexible symbol). That is, even when all/part of slots (symbols) for transmission of delayed/shifted additional SRS are located in the region according to the retuning time after receiving the DL channel/RS, it may be considered a collision.

Option 1) A terminal may not expect to collide (fully/partially) between the delayed/shifted additional SRS and transmission/reception of a DL/UL channel/RS by DL/UL DCI at a symbol level in a flexible slot (flexible symbol). Alternatively, a terminal may not expect an indication of DL channel/RS reception by DL DCI or an indication of UL channel/RS transmission by a UL DCI/RAR UL grant in a flexible slot (flexible symbol) for a corresponding SRS transmission.

As described above, a terminal may receive configuration information for one or more SRS resource sets from a base station through higher layer signaling, and (additional) SRS transmission for one or more SRS resource sets in the configured one or more SRS resource sets may be triggered (or indicated) by DCI.

As described above, an SRS for an SRS resource set triggered (indicated) by DCI is transmitted in a slot (or one or more symbols in a slot available for SRS transmission) available for transmitting an SRS (as delayed/shifted). Here, a slot in which an SRS for an SRS resource set triggered (indicated) by DCI is transmitted (or one or more symbols in a slot available for SRS transmission) may be determined regardless of a slot offset configured by higher layer signaling (e.g., RRC signaling) for the SRS resource set. In addition, even though a slot after a slot offset from a time/slot at which an (additional) SRS is triggered (e.g., time/slot at which DCI is received) is not a UL slot, a terminal may transmit (additional) SRS in a slot in which an SRS is transmitted (or one or more symbols in a slot available for SRS transmission).

Meanwhile, a downlink slot and a uplink slot may be configured by higher layer signaling (e.g., the 'tdd-UL-DL-ConfigurationCommon' configuration and/or the 'tdd-UL-DL-ConfigurationDedicated' configuration) and other slots may be configured as a flexible slot. For example, a flexible slot may mean a slot including one or more flexible symbols.

As described above, when a slot (or one or more symbols in a corresponding slot) in which an SRS for an SRS resource set triggered (indicated) by DCI is transmitted corresponds to a flexible slot (flexible symbol), a terminal may not expect an indication (i.e., DL channel/RS scheduling) of DL channel/RS reception by DL DCI or an indication (i.e., UL channel/RS scheduling) of UL channel/RS transmission by UL DCI/RAR UL grant in a flexible slot (flexible symbol) for a corresponding SRS transmission.

For example, when a slot in which an SRS for an SRS resource set triggered (indicated) by DCI is transmitted (i.e., a slot determined to transmit an SRS) corresponds to a flexible slot, a terminal may not expect an indication (i.e., DL channel/RS scheduling) of DL channel/RS reception by DL DCI or an indication (i.e., UL channel/RS scheduling) of UL channel/RS transmission by UL DCI/RAR UL grant in a corresponding flexible slot.

As another example, when one or more symbols (i.e., one or more symbols determined to transmit SRS) in which an SRS for an SRS resource set triggered (indicated) by DCI is transmitted correspond to a flexible symbol, a terminal may not expect an indication (i.e., DL channel/RS scheduling) of DL channel/RS reception by DL DCI or an indication (i.e., UL channel/RS scheduling) of UL channel/RS transmission by UL DCI/RAR UL grant in a corresponding flexible symbol.

As another example, a subset (i.e., some symbols) of one or more symbols (i.e., one or more symbols determined to transmit SRS) in which an SRS for an SRS resource set triggered (indicated) by DCI is transmitted corresponds to a flexible symbol, a terminal may not expect an indication (i.e., DL channel/RS scheduling) of DL channel/RS reception by DL DCI or an indication (i.e., UL channel/RS scheduling) of UL channel/RS transmission by UL DCI/RAR UL grant in a corresponding flexible symbol.

Option 2-1) A terminal deprioritizes an (additional) SRS and drops all the delayed/shifted (additional) SRS.

When a terminal is indicated to receive a DL channel/RS by DL DCI in which an SRS for an SRS resource set triggered (indicated) by DCI is transmitted or to transmit a UL channel/RS by UL DCI/RAR UL grant in the corresponding flexible slot (flexible symbol), the terminal may drop all SRSs. Here, even if only a part of a flexible slot (flexible symbol) in which an SRS is transmitted overlaps with a DL/UL channel/RS by DL/UL DCI at a symbol level, a terminal may drop all SRSs.

In this case, a terminal may perform an operation indicated by corresponding DL DCI or UL DCI/RAR UL grant in a flexible slot (flexible symbol) in which an SRS is not transmitted.

Option 2-2) A terminal may deprioritize an (additional) SRS, and transmit only symbol(s) overlapped with a DL/UL channel/RS by the DL/UL DCI among the delayed/shifted (additional) SRS symbols at a symbol level, transmit an SRS in the remaining symbols.

Here, in consideration of a radio frequency (RF) retuning time from downlink to uplink, a terminal may also drop (additional) SRS symbol(s) for a retuning time even after DL channel/RS reception.

Option 2-3) A terminal may deprioritize an (additional) SRS and transmit an SRS in symbol(s) that do not overlap with a DL/UL channel/RS by the DL/UL DCI among the delayed/shifted (additional SRS) symbols at a symbol level. In addition, the remaining overlapping SRS transmission symbol(s) are transmitted in a next valid slot (e.g., UL slot, flexible slot (flexible symbol), etc.) after delay/shift at a slot level. That is, SRS transmission symbol(s) overlapping a DL/UL channel/RS by the DL/UL DCI may be transmitted in a slot available for subsequent SRS transmission.

Here, in consideration of a radio frequency (RF) retuning time from downlink to uplink, a terminal may also delay/shift an (additional) SRS symbol(s) for a retuning time even after receiving a DL channel/RS.

Option 2-4) A terminal may deprioritize an (additional) SRS, and after delay/shifting the delayed/shifted (additional) SRS at a slot level again, it may be transmitted in a next valid slot (e.g., UL slot, flexible slot (flexible symbol), etc.). For example, even if some SRS transmission symbol(s) overlap with a DL/UL channel/RS by the DL/UL DCI, all SRSs may be transmitted in a slot available for subsequent SRS transmission.

In an operation of transmitting an (additional) SRS after an additional (second) delay/shift of the above-described options 2-3 and 2-4, a terminal may transmit an (additional) SRS in a next valid slot by maintaining a symbol level position of an (additional) SRS in an RRC configuration as it is. For example, if a symbol level position was the k-th symbol in an SRS transmission slot determined after the first delay/shift, even in an SRS transmission slot determined after an additional delay/shift, a symbol level position may correspond to the k-th symbol.

Alternatively, in a next valid slot, a terminal may transmit i) an SRS from the earliest symbol, or ii) an SRS from the earliest symbol among valid symbols (remaining after transmitting another channel). Here, the i) operation or ii) operation may be configured/indicated by a base station.

Option 3) A terminal may prioritize the one indicated by the latest (i.e., later) DCI among DCI triggering the delay/shifted (additional) SRS and DCI indicating transmission/reception of a DL/UL channel/RS. In addition, a low-priority operation (i.e., SRS transmission or DL/UL channel/RS transmission/reception previously indicated by DCI) may follow one of the above-described option 2 methods (i.e., options 2-1/2-2/2-3/2-4).

For example, when DCI triggering delayed/shifted additional SRS is received more recently than DCI indicating reception/transmission of a DL/UL channel/RS, a terminal may drop reception/transmission of a DL/UL channel/RS according to option 2-1 above so that an additional SRS is prioritized.

The previously described optional operations (option 1/2-1/2-2/2-3/2-4/3) may be applied even when an additional SRS (delay/shifted) in a normal UL slot collides with a UL channel/RS (indicated by UL DCI) at a symbol level.

Proposal 3-2: When a terminal recognizes a downlink/uplink/flexible symbol configuration of a corresponding flexible slot (flexible symbol) by a terminal-specific configuration information (i.e., 'tdd-UL-DL-Configuration-Dedicated' configuration) related to a slot configuration, a terminal may transmit the (additional) SRS only when a symbol level position of the delayed/shifted (additional) SRS is in a subset of symbols configured as uplink/flexible.

In other words, when a symbol level position of the delayed/shifted (additional) SRS is included in symbols configured as uplink/flexible by the terminal-specific configuration information related to the slot configuration, a terminal may transmit an SRS in corresponding symbols. That is, the one or more SRS transmission symbols may be determined only in symbols configured as uplink/flexible by the terminal-specific configuration information related to the slot configuration.

Alternatively, when a symbol level position of the delayed/shifted additional SRS overlaps symbols configured as downlink, a terminal may perform an operation of the option 2(2-1/2-2/2-3/2-4)/option 3. For example, a terminal may deprioritize an SRS and drop all SRSs (option 2-1) or may drop only an SRS overlapping symbols configured as downlink (option 2-2). Alternatively, a terminal may deprioritize an SRS and delay/shift additionally at a slot level and transmit the SRS in a slot available for SRS transmission (option 2-4) or may transmit only SRS overlapping with symbols configured as downlink in a slot available for SRS transmission (option 2-3). Considering the temporal precedence relationship between the terminal-specific configuration information related to the slot configuration and DCI triggering SRS transmission, a terminal may perform the same operation as option 3.

If, in a subset of symbols configured as uplink/flexible by the terminal-specific configuration information (by higher layer signaling or by UL DCI/RAR UL grant), one or more symbols in which the SRS is transmitted and a UL channel/RS collide (fully/partially) at a symbol level, a terminal may perform the same operation as option 1/option 2(2-1/2-2/2-3/2-4)/option 3.

For example, as in option 1 above, a terminal may not expect an indication (i.e., UL channel/RS scheduling) of UL channel/RS transmission by higher layer signaling (e.g., RRC signaling or MAC CE) or by UL DCI/RAR UL grant in uplink/flexible symbol(s) where an SRS is transmitted in a subset of symbols configured as uplink/flexible.

Because a symbol configuration of a flexible slot (flexible symbol) is semi-statically configured by a higher layer through the operation of the proposal 3-2, it is possible to solve the problem that an SRS may be located in a position configured as a downlink symbol due to an unexpected delay/shift of an additional SRS.

Proposal 3-3: When, in a corresponding flexible slot (flexible symbol), a terminal recognizes a downlink/uplink/flexible symbol configuration by an SFI field (or SFI-index indication) due to DCI format 2_0 detection of the terminal. the terminal may transmit the (additional) SRS only when a symbol level position of the delayed/shifted (additional) SRS is in a subset of symbols indicated as uplink/flexible by the SFI field (or SFI-index indication). In other words, when a symbol level position of the delayed/shifted (additional) SRS is included in symbols configured as uplink/flexible by an SFI field (or SFI-index indication), a terminal may transmit an SRS in the corresponding symbols. That is, the one or more SRS transmission symbols may be determined only in symbols configured as uplink/flexible by an SFI field (or SFI-index indication).

Alternatively, a terminal may expect to be indicated as uplink/flexible by an SFI field (or SFI-index indication) for a symbol level position of the delayed/shifted (additional) SRS.

If, in a subset of the symbols indicated as uplink/flexible (by higher layer signaling or by UL DCI/RAR UL grant), one or more symbols in which the SRS is transmitted and a UL channel/RS collide (fully/partially) at the symbol level, a terminal may perform the same operation as the option 1/option 2 (2-1/2-2/2-3/2-4)/option 3.

A terminal may not expect an indication (i.e., UL channel/RS scheduling) of UL channel/RS transmission by higher layer signaling (e.g., RRC signaling or MAC CE) or by UL DCI/RAR UL grant in uplink/flexible symbol(s) in which an SRS is transmitted in a subset of symbols configured as uplink/flexible in an SFI field (or SFI-index indication).

If the delayed/shifted (additional) SRS is an aperiodic SRS, a base station can know that it will be transmitted in a corresponding flexible slot (flexible symbol). Therefore, through the operation of Proposition 3-3, it has an advantage that a base station can perform dynamically an SFI-index indication in a DCI format so that a location of an (additional) SRS is located in a uplink/flexible symbol in a corresponding slot (symbol) and a terminal can expect so.

Proposal 3 (Proposal 3-1/3-2/3-3) of Method 2 described above may be extended to a situation in which an (additional) SRS is cross-carrier scheduled and a situation of carrier aggregation (CA). That is, it is possible to prevent collision/overlapping between a transmission slot (or symbol) of an SRS and other downlink/uplink on different carriers.

Proposal 3 (Proposal 3-1/3-2/3-3) of Method 2 described above is applicable not only to an (additional SRS) but also to the case of transmission of a specific UL RS/channel and the case where a corresponding UL RS/channel collides with a specific DL/UL RS/channel.

Embodiment 2

Method 3: A UE operation for collision between an additional SRS and a PUSCH and/or collision between SRSs in a CA (Carrier Aggregation) situation In the existing LTE up to Rel-15, when an SRS and a PUSCH collide within one serving cell, or when an SRS and a PUSCH transmitted on different serving cells collide, an SRS was dropped by giving a higher priority to a PUSCH.

In addition, when an SRS and a PUSCH are scheduled simultaneously (e.g., in the same subframe) on different serving cells in a CA situation according to UE's capability, an operation is determined according to a sum of SRS and PUSCH transmission power. If the sum of SRS and PUSCH transmission power does not exceed a maximum transmission power of the corresponding UE, the UE may simultaneously transmit an SRS and a PUSCH of different cells. On the other hand, if the sum of SRS and PUSCH transmission power exceeds a maximum transmission power of the corresponding UE, the UE may prioritize a PUSCH and clips power of an SRS and scale it down to simultaneously transmit or may drop an SRS itself.

On the contrary, it is proposed for a UE operation for a collision of a PUSCH with an additional SRS in a CA situation of an enhanced UE after Rel-16.

Proposal 1: In a single serving cell situation or CA situation of a UE, when an additional SRS and a PUSCH are scheduled at the same time (e.g., in the same subframe or slot) on the same serving cell and a collision occurs at the same time, the UE may drop a PUSCH by prioritizing an additional SRS and transmit an additional SRS. In addition, when an additional SRS and PUSCH are scheduled at the same time (e.g., in the same subframe or slot) on different serving cells in a CA situation and a collision occurs at the same time, the UE may drop an additional SRS by prioritizing a PUSCH and transmit a PUSCH.

Proposal 1 of the above-described Method 3 proposes an operation in which a UE drops a PUSCH when a collision between an additional SRS and a PUSCH on the same serving cell occurs in a single serving cell or CA situation of the UE. In addition, when a collision between different cells occurs, an operation in which a UE drops an SRS is proposed. For a collision on the same serving cell, although a base station configures/indicates an additional SRS to acquire DL information, it is regarded as an error case in which a collision with a PUSCH occurs, and thus has an effect of clearly determining a UE operation. For a collision between different cells, there is an effect of prioritizing and protecting information (data, DL HARQ feedback, etc.) carried in a PUSCH like the existing LTE.

Proposal 2: An operation of a UE may be determined based on a capability for a maximum transmit power (power) of the UE. In a CA situation, when an additional SRS and a PUSCH are scheduled simultaneously (e.g., in the same subframe or slot) on different serving cells and a collision occurs at the same time point, the following operation is performed. If a sum of transmission power of an additional SRS and a PUSCH does not exceed a maximum transmission power of a corresponding UE, an additional SRS and a PUSCH of different cells may be simultaneously transmitted. On the other hand, if a sum of transmission power of an additional SRS and a PUSCH exceeds a maximum transmission power of a corresponding UE, an additional SRS has a higher priority, then PUSCH transmission power is scaled down and transmitted simultaneously, or a PUSCH itself may be dropped (i.e., PUSCH is not transmitted).

In addition, a specific UE capability is defined for whether such an additional SRS and a PUSCH can be transmitted at the same time, and a UE may report to a base station for the corresponding capability.

In addition, a base station may configure/indicate a UE on whether simultaneous transmission of such an additional SRS and a PUSCH is possible. If simultaneous transmission is indicated by a corresponding configuration/indication, a UE may simultaneously transmit an additional SRS and a PUSCH (even by scaling down transmission power of a PUSCH). Alternatively, when it is indicated that simultaneous transmission is impossible by a corresponding configuration/indication, a UE may drop a PUSCH itself as described above.

In Proposal 2 of Method 3, when an additional SRS and a PUSCH are simultaneously configured/indicated on different serving cells in a CA situation, it may have an effect of resolving ambiguity in a UE operation. In addition, unlike the existing LTE, there is an effect of prioritizing an additional SRS for obtaining information for DL scheduling or obtaining DL CSI information to define simultaneous transmission and dropping rules.

Proposal 3: In a case of a collision occurring because an additional SRS and an SRS of UpPTS are configured/indicated at the same time (e.g., in the same subframe or slot) on different serving cells in the CA situation of a UE, the UE may transmit the additional SRS by prioritizing the additional SRS.

Alternatively, by comparing the number of symbols of an additional SRS and the number of symbols of an SRS of UpPTS in which the collision occurs, a UE may transmit an SRS allocated with the larger number of symbols, and drop an SRS allocated with the smaller number of symbols. If the number of symbols is the same, a UE may transmit an additional SRS and drop an SRS of UpPTS. Alternatively, if it has the same number of symbols, a UE may transmit an SRS of a cell/cell group having a higher priority (PCell (primary cell)>PSCell (primary secondary cell)>SCell (secondary cell), and/or MCG (master cell group)>SCG (secondary cell group))) and drop an SRS of a cell/cell group having a lower priority.

In addition, in a CA situation of a UE, when additional SRSs on different serving cells are configured/indicated at the same time (e.g., in the same subframe or slot) to cause a collision, a UE may transmit an additional SRS of a cell/cell group with a higher priority (PCell>PSCell>SCell, and/or MCG>SCG), and drop an additional SRS of a cell/cell group with a lower priority. By comparing the number of symbols of additional SRSs in which collision has occurred, a UE may drop by deprioritizing an SRS having the smaller number of symbols.

In addition, in a collision between an additional SRS and an SRS of UpPTS on the different serving cells and/or between additional SRSs on the different serving cells, a specific UE capability is defined for simultaneous transmission of two entities (e.g., SRS), and a UE may report the capability to a base station. If a sum of transmission powers of two colliding entities (e.g., SRS) does not exceed a maximum transmission power of a UE in a UE capability, the UE can simultaneously transmit two entities of different cells. On the other hand, if a sum of transmit power of two colliding entities exceeds a maximum transmit power of a corresponding UE, according to the priority rule of the Proposal 3 of the above-described Method 3, transmission power of the deprioritized entity may be scaled down and transmitted at the same time or the deprioritized entity may be dropped. In addition, a base station may configure/indicate a UE on whether to transmit these two entities at the same time.

Proposal 3 of the above-described Method 3, when a UE has a different TDD configuration (i.e., UL-DL configuration) for each cell in a CA situation of a UE, there is an effect of resolving ambiguity of a UE operation in case of collision between an additional SRS and an SRS of UpPTS. In addition, there is an effect of resolving ambiguity of a UE operation in case of collision between an additional SRSs on different serving cells. For example, when an additional SRS of 13 symbols (i.e., symbol indices 0 to 12) collide with an SRS of UpPTS of the last two symbols (i.e., symbol indices 12 and 13), if an additional SRS is dropped because of one overlapping symbol, it can be seen as a waste of resource utilization. Therefore, there is an effect of minimizing resource waste by defining a dropping rule according to the number of symbols.

In an operation between a base station and a terminal, the proposal 1 or the proposal 2 or the proposal 3 of the above-described method 3 can be applied independently, and also can be applied to any combination of two or more in the proposals 1, 2, and 3 of the method 3.

Figure 9:
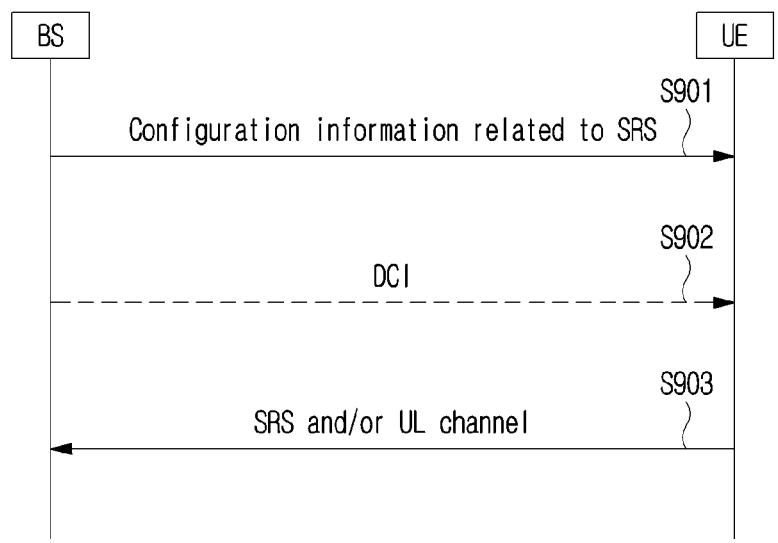
FIG. 9 is a diagram illustrating a signaling procedure between a base station and a terminal for an uplink transmission method according to an embodiment of the present disclosure.

FIG. 9 is a diagram illustrating a signaling procedure between a base station and a terminal for an uplink transmission method according to an embodiment of the present disclosure.

FIG. 9 exemplifies a signaling procedure between a terminal and a base station based on the previously proposed Embodiment 1 (Method 1, Method 2) and Embodiment 2 (Method 3). The example of FIG. 9 is for convenience of description, and does not limit the scope of the present disclosure. Some step(s) illustrated in FIG. 9 may be omitted depending on circumstances and/or configurations. In addition, a base station and a terminal in FIG. 9 are only one example, and may be implemented as the apparatus illustrated in FIG. 13 below. For example, the processor 102/202 of FIG. 13 may control to transmit/receive a channel/signal/data/information (e.g., SRS-related configuration information, DCI for UL/DL scheduling, additional SRS, PDCCH, PDSCH, PUSCH, PUCCH, PHICH, etc.) using the transceiver 106/206, and may be control to store the transmitted or received channel/signal/data/information in the memory 104/204.

In FIG. 9, based on the methods described in Method 1, Method 2 of Embodiment 1 and/or Method 3 of Embodiment 2 described above, it is assumed that a UE performs uplink transmission (e.g., UL channel, additional SRS, etc.).

Referring to FIG. 9, a base station (BS) may transmit configuration information related to an SRS to a user equipment (UE) (S901).

That is, a UE may receive configuration information related to an SRS from a base station.

Here, as in the above-described Methods 1 to 3, configuration information related to an SRS may include information related to SRS (e.g., additional SRS, UpPts SRS, etc.) transmission. For example, as an example of information related to SRS transmission, information on time (slot and/or symbol)/frequency/spatial resource in which an SRS is transmitted, cell information in which an SRS is configured, and information on a period and number of repetitions for a periodic SRS, and a slot offset for an aperiodic SRS, etc.

In addition, as in the above-described Method 2, configuration information related to an SRS may include a subframe(s) (or slot(s)) available for transmitting an additional SRS and/or subframe(s) (or slot(s)) to prioritize an additional SRS.

An SRS may be at least one of periodic transmission, semi-persistent transmission, and aperiodic transmission.

Here, configuration information related to an SRS may be transmitted through higher layer signaling (e.g., RRC signaling) and/or dynamic signaling (e.g., MAC CE or DCI). For example, in a case of RRC signaling, configuration information related to an SRS may include the SoundingRS-UL-Config information element (IE) and/or the SRS-config IE.

A base station may transmit DCI related to transmission such as an SRS and/or a UL channel (or DL channel), etc. to a UE (through a PDCCH) (S902).

That is, a UE may receive DCI related to transmission such as an SRS and/or a UL channel (or DL channel), etc. from the base station (through a PDCCH).

Here, DCI may correspond to DCL (i.e., DCI for DL channel scheduling, DCI for UL channel scheduling) in Methods 1 to 3 described above.

In addition, in the case of aperiodic SRS transmission, as described in Method 2 and/or Method 3 above, SRS transmission may be triggered by DCI in step S902.

In addition, as in Method 2 above, DCI may indicate a slot offset for an additional SRS, and/or DCI may indicate whether a triggered SRS has priority over an uplink channel.

A UE may transmit an SRS and/or a UL channel(s), based on the received configuration information related to an SRS and DCI (S903).

For example, if an additional SRS is triggered by DCI scheduling a DL channel in step S902 of the proposal of method 1 above, a transmission timing of an SRS (e.g., a subframe and/or a slot) may be determined according to proposal 1-1 and/or proposal 1'-1 of Method 2 above.

For example, if an additional SRS is triggered by DCI scheduling a UL channel in step S902 of the proposal of method 1 above, a transmission timing of a UL channel and/or an SRS (e.g., a subframe and/or a slot) may be determined according to proposal 1-2 and/or proposal 1'-2 of Method 2 above.

Here, as in proposal 1'-2 of Method 2 above, if a UL channel and an additional SRS transmission slot are different or a UL channel and an additional SRS do not collide at the symbol level, a UE may transmit both a UL channel and an additional SRS. However, as in proposal 1'-2 of Method 2 above, if a UL channel and an additional SRS have the same transmission slot and collide at the symbol level in the corresponding slot, a UE may transmit a PUSCH in the corresponding slot, and may delay/shift the SRS transmission.

In addition, as in proposal 2 and/or 2' of Method 2 above, when transmission subframes (or slots) of a UL channel and an additional SRS are the same or a UL channel and an additional SRS collide at the symbol level, a UE may determine a priority between an SRS and a UL channel according to whether the corresponding subframe (or slot) is a predetermined subframe (or symbol) in which SRS transmission is prioritized. Here, in a case of a subframe (or symbol) in which SRS transmission is prioritized, a priority between an SRS and a UL channel may be determined according to the 'priority rule' according to the present disclosure, as in proposal 2 of Method 2 above.

In addition, as in the above-described Method 3, in a situation in which a UE is configured with a single serving cell or a CA, when collision occurs because an additional SRS and a PUSCH are simultaneously scheduled on the same serving cell, an operation of proposal 1 of Method 3 may be performed. In addition, in a situation in which a UE is configured with a CA, when an additional SRS and a PUSCH are simultaneously scheduled on different serving cells and collide, an operation of proposal 2 of Method 3 may be performed. In addition, in a situation in which a UE is configured with a CA, when an additional SRS and a UpPTS SRS are simultaneously configured/indicated and collided on different serving cells, an operation of proposal 3 of Method 3 may be performed.

Thereafter, although not illustrated in FIG. 9, a base station may transmit an ACK/NACK for a PUSCH received from a UE in step S903 to the UE (through PHICH). That is, a UE may receive an ACK/NACK for a PUSCH transmitted in step S903 (via PHICH) from a base station. Here, when a DL/UL configuration (or TDD configuration) configured in a corresponding cell is 1/2/3/4/5, an operation according to proposal 1 of Method 1 may be performed. In addition, when a DL/UL configuration (or TDD configuration) configured in a corresponding cell is 0/6, an operation according to proposal 2 of Method 1 may be performed. In addition, regardless of a DL/UL configuration (or TDD configuration) configured in a corresponding cell, an operation according to suggestion 3 of Method 1 above may be performed.

Figure 10:
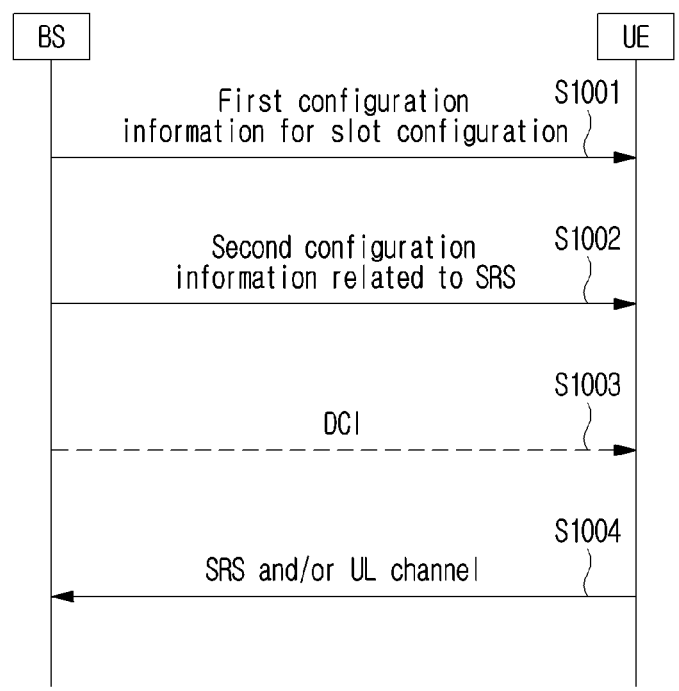
FIG. 10 is a diagram illustrating a signaling procedure between a base station and a terminal for an uplink transmission method according to an embodiment of the present disclosure.

FIG. 10 is a diagram illustrating a signaling procedure between a base station and a terminal for an uplink transmission method according to an embodiment of the present disclosure.

FIG. 10 exemplifies a signaling procedure between a terminal and a base station based on the previously proposed Embodiment 1 (Method 1, Method 2) and Embodiment 2 (Method 3). The example of FIG. 10 is for convenience of description, and does not limit the scope of the present disclosure. Some step(s) illustrated in FIG. 10 may be omitted depending on circumstances and/or configurations. In addition, a base station and a terminal in FIG. 10 are only one example, and may be implemented as the apparatus illustrated in FIG. 13 below. For example, the processor 102/202 of FIG. 13 may control to transmit/receive a channel/signal/data/information (e.g., SRS-related configuration information, DCI for UL/DL scheduling, additional SRS, PDCCH, PDSCH, PUSCH, PUCCH, PHICH, etc.) using the transceiver 106/206, and may be control to store the transmitted or received channel/signal/data/information in the memory 104/204.

Referring to FIG. 10, a base station (BS) may transmit first configuration information for a slot configuration to a user equipment (UE) (S1001).

That is, a UE may receive first configuration information for a slot configuration from a base station.

Here, first configuration information may mean downlink/uplink TDD configuration information. In other words, first configuration information may mean information for configuring a downlink slot, an uplink slot, and a flexible slot in TDD. First configuration information may include cell-specific configuration information (e.g., 'tdd-UL-DLConfigurationCommon') or terminal-specific configuration information (e.g., 'tdd-UL-DL-ConfigurationDedicated') or both. In addition, first configuration information may include DCI format 2_0 carrying a slot format indicator (SFI).

A base station (BS) may transmit configuration information related to an SRS to a user equipment (UE) (S1002).

That is, a UE may receive configuration information related to an SRS from a base station.

Configuration information related to an SRS may include information on one or more SRS resource sets, and may also include information on SRS resources for each of one or more SRS resource sets.

Here, as in the above-described Methods 1 to 3, configuration information related to an SRS may include information related to SRS (e.g., additional SRS, UpPts SRS, etc.) transmission. For example, as an example of information related to SRS transmission, information on time (slot and/or symbol)/frequency/spatial resource in which an SRS is transmitted, cell information in which an SRS is configured, and information on a period and number of repetitions for a periodic SRS, and a slot offset for an aperiodic SRS, etc.

In addition, as in the above-described Method 2, configuration information related to an SRS may include a subframe(s) (or slot(s)) available for transmitting an additional SRS and/or subframe(s) (or slot(s)) to prioritize an additional SRS.

An SRS may be at least one of periodic transmission, semi-persistent transmission, and aperiodic transmission.

Here, configuration information related to an SRS may be transmitted through higher layer signaling (e.g., RRC signaling) and/or dynamic signaling (e.g., MAC CE or DCI). For example, in a case of RRC signaling, configuration information related to an SRS may include the SoundingRS-UL-Config information element (IE) and/or the SRS-config IE.

A base station may transmit DCI related to transmission such as an SRS and/or a UL channel (or DL channel), etc. to a UE (through a PDCCH) (S1003).

That is, a UE may receive DCI related to transmission such as an SRS and/or a UL channel (or DL channel), etc. from the base station (through a PDCCH).

Here, DCI may correspond to DCL (i.e., DCI for DL channel scheduling, DCI for UL channel scheduling) in Methods 1 to 3 described above.

In addition, in the case of aperiodic SRS transmission, as described in Method 2 and/or Method 3 above, SRS transmission may be triggered by DCI in step S1003.

Here, as in proposal 3 (3-1/3-2/3-3) of Method 2 above, DCI may trigger SRS transmission for one or more SRS resource sets among one or more SRS resource sets configured by configuration information related to an SRS.

A UE may transmit an SRS and/or a UL channel(s), based on the received configuration information related to an SRS and DCI (S1004).

A UE may transmit an SRS to a base station in an SRS resource set triggered in step S1003 (i.e., in all SRS resources included in the SRS resource set).

Here, according to the proposals of Method 2 described above, a transmission timing of an SRS (e.g., a subframe and/or a slot and/or a symbol) may be determined.

For example, as in proposal 3-1 of Method 2 above, an SRS transmission slot may be determined from among available slots (e.g., uplink slot, flexible slot) for transmission of an SRS regardless of a slot offset configured in an SRS resource set triggered by DCI.

In addition, as in proposal 3-1 of Method 2 described above, even though a slot after a slot offset configured in an SRS resource set triggered by DCI from reception of the DCI is not an uplink slot, an SRS transmission slot may be determined from among available slots for transmission of an SRS (e.g., an uplink slot and a flexible slot).

A symbol level position (i.e., one or more SRS transmission symbols) of an SRS determined in slots available for SRS transmission may be located (partially/full) in a symbol previously configured as a flexible symbol by first configuration information of step S1001.

That is, all of one or more SRS transmission symbols may be located in symbols configured as flexible symbols. In this case, according to Option 1 of Proposal 3-1 of Method 2, a UE may not expect downlink scheduling (or uplink scheduling) by higher layer signaling or other DCI in all one or more SRS transmission symbols. That is, a base station may not perform downlink scheduling (or uplink scheduling) on all one or more SRS transmission symbols. Alternatively, according to options 2 and 3 of proposal 3-1 of Method 2 described above, scheduling of downlink/uplink transmission is allowed, however when one or more SRS transmission symbols overlap/collide with scheduled downlink/uplink transmission, a drop/delay operation is performed in consideration of a priority between SRS transmission and scheduled downlink/uplink transmission.

Alternatively, some of one or more SRS transmission symbols may be located in symbols configured as flexible symbols. In this case, as in option 1 of Proposal 3-1 of Method 2, a UE may not expect downlink scheduling (or uplink scheduling) in some symbols (i.e., flexible symbols) of one or more SRS transmission symbols. That is, a base station may not perform downlink scheduling (or uplink scheduling) by higher layer signaling or other DCI in some symbols (i.e., flexible symbols) of one or more SRS transmission symbols. Alternatively, as in options 2 and 3 of proposal 3-1 of Method 2 described above, scheduling of downlink/uplink transmission is allowed, however when some symbols (i.e., flexible symbols) of one or more SRS transmission symbols overlap/collide with scheduled downlink/uplink transmission, a drop/delay operation is performed in consideration of a priority between SRS transmission and scheduled downlink/uplink transmission.

In addition, as in proposal 3-2 of Method 2 above, when one or more SRS transmission symbols are included in symbols configured as uplink/flexible by terminal-specific configuration information related to a slot configuration (i.e., 'tdd-UL-DL-ConfigurationDedicated' configuration), a UE may transmit an SRS in the corresponding one or more SRS transmission symbols. In addition, operations of options of the above-mentioned proposal 3-1 may be performed.

In addition, when one or more SRS transmission symbols are included in symbols configured as uplink/flexible by an SFI field (or SFI-index indication) of DCI format 2_0, as in proposal 3-3 of Method 2 above, a UE may transmit an SRS in the corresponding one or more SRS transmission symbols. In addition, operations of options of the above-mentioned proposal 3-1 may be performed.

Figure 11:
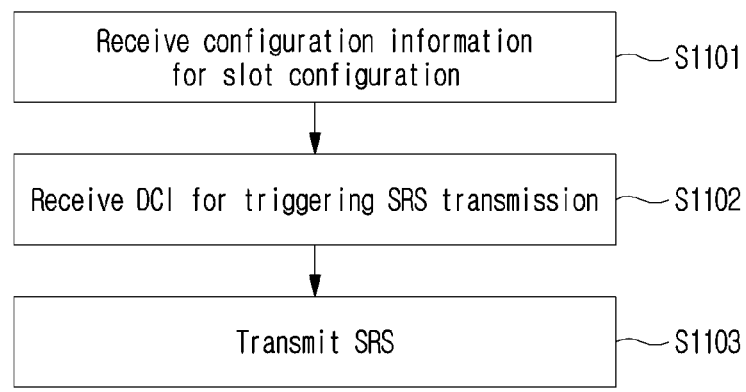
FIG. 11 is a diagram illustrating an operation of a terminal for an SRS transmission and reception method according to an embodiment of the present disclosure.

FIG. 11 is a diagram illustrating an operation of a terminal for an SRS transmission and reception method according to an embodiment of the present disclosure.

FIG. 11 exemplifies an operation of a terminal based on the previously proposed Embodiment 1 (Method 1, Method 2) and Embodiment 2 (Method 3). The example of FIG. 11 is for convenience of description, and does not limit the scope of the present disclosure. Some step(s) illustrated in FIG. 11 may be omitted depending on circumstances and/or configurations. In addition, a terminal in FIG. 11 is only one example, and may be implemented as the apparatus illustrated in FIG. 13 below. For example, the processor 102/202 of FIG. 13 may control to transmit/receive a channel/signal/data/information (e.g., SRS-related configuration information, DCI for UL/DL scheduling, additional SRS, PDCCH, PDSCH, PUSCH, PUCCH, PHICH, etc.) using the transceiver 106/206, and may be control to store the transmitted or received channel/signal/data/information in the memory 104/204.

Referring to FIG. 11, a UE may receive configuration information for a slot configuration from a base station (S1101).

Here, configuration information for a slot configuration may mean downlink/uplink TDD configuration information. In other words, configuration information for a slot configuration may mean information for configuring a downlink slot, an uplink slot, and a flexible slot in TDD. Configuration information for a slot configuration may include cell-specific configuration information (e.g., 'tdd-UL-DLConfiguration-Common') or terminal-specific configuration information (e.g., 'tdd-UL-DL-ConfigurationDedicated') or both. In addition, configuration information for a slot configuration may include DCI format 2_0 carrying a slot format indicator (SFI).

A terminal may receive DCI for triggering transmission of an SRS from a base station (through a PDCCH) (S1102).

Here, DCI may correspond to DCL (i.e., DCI for DL channel scheduling, DCI for UL channel scheduling) in Methods 1 to 3 described above.

Here, as in proposal 3 (3-1/3-2/3-3) of Method 2 above, DCI may trigger SRS transmission for one or more SRS resource sets among one or more SRS resource sets configured by configuration information related to an SRS.

A UE may transmit an SRS to a base station (S1103).

A UE may transmit an SRS to a base station in an SRS resource set triggered in step S1102 (i.e., in all SRS resources included in the SRS resource set).

Here, according to the proposals of Method 2 described above, a transmission timing of an SRS (e.g., a subframe and/or a slot and/or a symbol) may be determined.

For example, as in proposal 3-1 of Method 2 above, an SRS transmission slot may be determined from among available slots (e.g., uplink slot, flexible slot) for transmission of an SRS regardless of a slot offset configured in an SRS resource set triggered by DCI.

In addition, as in proposal 3-1 of Method 2 described above, even though a slot after a slot offset configured in an SRS resource set triggered by DCI from reception of the DCI is not an uplink slot, an SRS transmission slot may be determined from among available slots for transmission of an SRS (e.g., an uplink slot and a flexible slot).

One or more SRS transmission symbols for SRS transmission may be determined in an SRS transmission slot determined in slots available for SRS transmission. Here, a determined symbol level position (i.e., one or more SRS transmission symbols) of an SRS may be located (partially/full) in a symbol previously configured as a flexible symbol by configuration information of step S1101.

For example, all of one or more SRS transmission symbols may be located in symbols configured as flexible symbols. In this case, according to Option 1 of Proposal 3-1 of Method 2, a UE may not expect downlink scheduling (or uplink scheduling) by higher layer signaling or other DCI in all one or more SRS transmission symbols. That is, a base station may not perform downlink scheduling (or uplink scheduling) on all one or more SRS transmission symbols. Alternatively, according to options 2 and 3 of proposal 3-1 of Method 2 described above, scheduling of downlink/uplink transmission is allowed, however when one or more SRS transmission symbols overlap/collide with scheduled downlink/uplink transmission, a drop/delay operation is performed in consideration of a priority between SRS transmission and scheduled downlink/uplink transmission.

Alternatively, some of one or more SRS transmission symbols may be located in symbols configured as flexible symbols. In this case, as in option 1 of Proposal 3-1 of Method 2, a UE may not expect downlink scheduling (or uplink scheduling) in some symbols (i.e., flexible symbols) of one or more SRS transmission symbols. That is, a base station may not perform downlink scheduling (or uplink scheduling) by higher layer signaling or other DCI in some symbols (i.e., flexible symbols) of one or more SRS transmission symbols. Alternatively, as in options 2 and 3 of proposal 3-1 of Method 2 described above, scheduling of downlink/uplink transmission is allowed, however when some symbols (i.e., flexible symbols) of one or more SRS transmission symbols overlap/collide with scheduled downlink/uplink transmission, a drop/delay operation is performed in consideration of a priority between SRS transmission and scheduled downlink/uplink transmission.

In addition, as in proposal 3-2 of Method 2 above, when one or more SRS transmission symbols are included in symbols configured as uplink/flexible by terminal-specific configuration information related to a slot configuration (i.e., 'tdd-UL-DL-ConfigurationDedicated' configuration), a UE may transmit an SRS in the corresponding one or more SRS transmission symbols. In addition, operations of options of the above-mentioned proposal 3-1 may be performed.

In addition, when one or more SRS transmission symbols are included in symbols configured as uplink/flexible by an SFI field (or SFI-index indication) of DCI format 2_0, as in proposal 3-3 of Method 2 above, a UE may transmit an SRS in the corresponding one or more SRS transmission symbols. In addition, operations of options of the above-mentioned proposal 3-1 may be performed.

Figure 12:
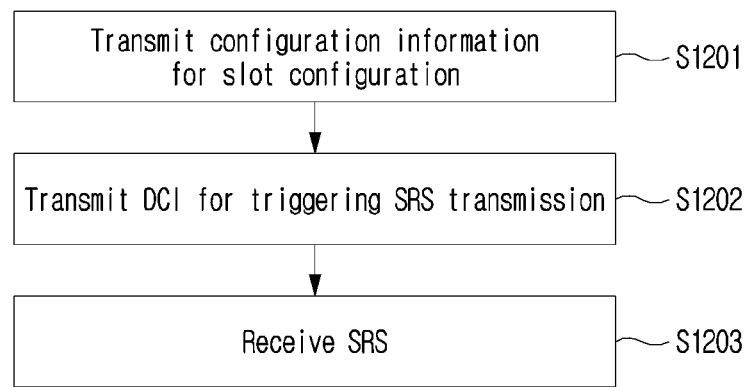
FIG. 12 is a diagram illustrating an operation of a terminal for an SRS transmission and reception method according to an embodiment of the present disclosure.

FIG. 12 is a diagram illustrating an operation of a terminal for an SRS transmission and reception method according to an embodiment of the present disclosure.

FIG. 12 exemplifies an operation of a base station based on the previously proposed Embodiment 1 (Method 1, Method 2) and Embodiment 2 (Method 3). The example of FIG. 12 is for convenience of description, and does not limit the scope of the present disclosure. Some step(s) illustrated in FIG. 12 may be omitted depending on circumstances and/or configurations. In addition, a base station in FIG. 12 is only one example, and may be implemented as the apparatus illustrated in FIG. 13 below. For example, the processor 102/202 of FIG. 13 may control to transmit/receive a channel/signal/data/information (e.g., SRS-related configuration information, DCI for UL/DL scheduling, additional SRS, PDCCH, PDSCH, PUSCH, PUCCH, PHICH, etc.) using the transceiver 106/206, and may be control to store the transmitted or received channel/signal/data/information in the memory 104/204.

Referring to FIG. 12, a base station may transmit configuration information for a slot configuration to a terminal (S1201).

Here, configuration information for a slot configuration may mean downlink/uplink TDD configuration information. In other words, configuration information for a slot configuration may mean information for configuring a downlink slot, an uplink slot, and a flexible slot in TDD. Configuration information for a slot configuration may include cell-specific configuration information (e.g., 'tdd-UL-DLConfigurationCommon') or terminal-specific configuration information (e.g., 'tdd-UL-DL-ConfigurationDedicated') or both. In addition, configuration information for a slot configuration may include DCI format 2_0 carrying a slot format indicator (SFI).

A base station may transmit DCI for triggering transmission of an SRS to a terminal (through a PDCCH) (S1202).

Here, DCI may correspond to DCL (i.e., DCI for DL channel scheduling, DCI for UL channel scheduling) in Methods 1 to 3 described above.

Here, as in proposal 3 (3-1/3-2/3-3) of Method 2 above, DCI may trigger SRS transmission for one or more SRS resource sets among one or more SRS resource sets configured by configuration information related to an SRS.

A base station may receive an SRS from a terminal (S1203).

A base station may receive an SRS from a terminal in an SRS resource set triggered in step S1202 (i.e., in all SRS resources included in the SRS resource set).

Here, according to the proposals of Method 2 described above, a transmission timing of an SRS (e.g., a subframe and/or a slot and/or a symbol) may be determined.

For example, as in proposal 3-1 of Method 2 above, an SRS transmission slot may be determined from among available slots (e.g., uplink slot, flexible slot) for transmission of an SRS regardless of a slot offset configured in an SRS resource set triggered by DCI.

In addition, as in proposal 3-1 of Method 2 described above, even though a slot after a slot offset configured in an SRS resource set triggered by DCI from reception of the DCI is not an uplink slot, an SRS transmission slot may be determined from among available slots for transmission of an SRS (e.g., an uplink slot and a flexible slot).

One or more SRS transmission symbols for SRS transmission may be determined in an SRS transmission slot determined in slots available for SRS transmission. Here, a determined symbol level position (i.e., one or more SRS transmission symbols) of an SRS may be located (partially/full) in a symbol previously configured as a flexible symbol by configuration information of step S1101.

For example, all of one or more SRS transmission symbols may be located in symbols configured as flexible symbols. In this case, according to Option 1 of Proposal 3-1 of Method 2, a UE may not expect downlink scheduling (or uplink scheduling) by higher layer signaling or other DCI in all one or more SRS transmission symbols. That is, a base station may not perform downlink scheduling (or uplink scheduling) on all one or more SRS transmission symbols. Alternatively, according to options 2 and 3 of proposal 3-1 of Method 2 described above, scheduling of downlink/uplink transmission is allowed, however when one or more SRS transmission symbols overlap/collide with scheduled downlink/uplink transmission, a drop/delay operation is performed in consideration of a priority between SRS transmission and scheduled downlink/uplink transmission.

Alternatively, some of one or more SRS transmission symbols may be located in symbols configured as flexible symbols. In this case, as in option 1 of Proposal 3-1 of Method 2, a UE may not expect downlink scheduling (or uplink scheduling) in some symbols (i.e., flexible symbols) of one or more SRS transmission symbols. That is, a base station may not perform downlink scheduling (or uplink scheduling) by higher layer signaling or other DCI in some symbols (i.e., flexible symbols) of one or more SRS transmission symbols. Alternatively, as in options 2 and 3 of proposal 3-1 of Method 2 described above, scheduling of downlink/uplink transmission is allowed, however when some symbols (i.e., flexible symbols) of one or more SRS transmission symbols overlap/collide with scheduled downlink/uplink transmission, a drop/delay operation is performed in consideration of a priority between SRS transmission and scheduled downlink/uplink transmission.

In addition, as in proposal 3-2 of Method 2 above, when one or more SRS transmission symbols are included in symbols configured as uplink/flexible by terminal-specific configuration information related to a slot configuration (i.e., 'tdd-UL-DL-ConfigurationDedicated' configuration), a UE may transmit an SRS in the corresponding one or more SRS transmission symbols. In addition, operations of options of the above-mentioned proposal 3-1 may be performed.

In addition, when one or more SRS transmission symbols are included in symbols configured as uplink/flexible by an SFI field (or SFI-index indication) of DCI format 2_0, as in proposal 3-3 of Method 2 above, a UE may transmit an SRS in the corresponding one or more SRS transmission symbols. In addition, operations of options of the above-mentioned proposal 3-1 may be performed.

General Device to Which the Present Disclosure May be Applied

Figure 13:
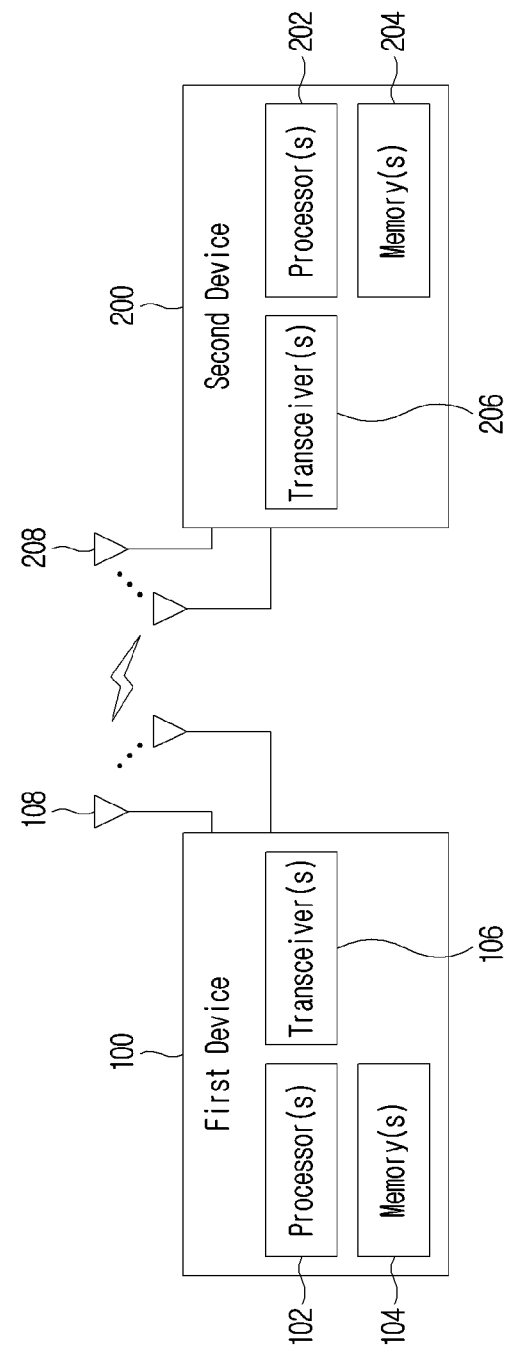
FIG. 13 illustrates a block diagram of a wireless communication device according to an embodiment of the present disclosure.

FIG. 13 is a diagram which illustrates a block diagram of a wireless communication device according to an embodiment of the present disclosure.

In reference to FIG. 13, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a terminal in a wireless communication system, the method comprising:
receiving, from a base station, configuration information related to a sounding reference signal (SRS), wherein the configuration information includes information on a slot offset between triggering downlink control information (DCI) and SRS transmission;
receiving, from the base station, information related to a slot configuration;
receiving, from the base station, DCI for triggering transmission of an SRS for one or more SRS resource sets; and
transmitting, to the base station, the SRS in each of the one or more SRS resource sets,
wherein the SRS is transmitted in an available slot for SRS transmission determined based on a slot determined by the information on the slot offset, and
wherein based on at least one symbol for transmission of the SRS in the available slot being configured as flexible symbols by the information, the terminal does not expect to receive scheduling of downlink transmission to be transmitted on the at least one symbol.

2. The method of claim 1, wherein the downlink scheduling is performed by DCI or radio resource control (RRC) signaling.

3. The method of claim 1,
wherein the information includes terminal-specific configuration information related to the slot configuration,
wherein the at least one symbol is determined only in symbols configured as flexible symbols or uplink symbols by the terminal-specific configuration information.

4. The method of claim 1,
wherein the information includes second DCI including a slot format indicator (SFI) field,
wherein the at least one symbol is determined only in symbols configured as flexible symbols or uplink symbols by the SFI field.

5. The method of claim 1,
wherein the information includes second DCI including a slot format indicator (SFI) field,
wherein the at least one symbol is indicated as flexible symbols or uplink symbols by the SFI field.

6. The method of claim 1, wherein the slot available for the SRS corresponds to one of i) a slot including only uplink symbols, ii) a slot including only flexible symbols, or iii) a slot including one or more uplink symbols and one or more flexible symbols.

7. A terminal operating in a wireless communication system, the terminal comprising:
at least one transceiver for transmitting and receiving a wireless signal; and
at least one processor for controlling the at least one transceiver,
wherein the at least one processor configured to:
receive, from a base station, configuration information related to a sounding reference signal (SRS), wherein the configuration information includes information on a slot offset between triggering downlink control information (DCI) and SRS transmission;
receive, from the base station, information related to a slot configuration;
receive, from the base station, DCI for triggering transmission of an SRS for one or more SRS resource sets; and
transmit, to the base station, the SRS in each of the one or more SRS resource sets,
wherein the SRS is transmitted in an available slot for SRS transmission determined based on a slot determined by the information on the slot offset, and
wherein based on at least one symbol for transmission of the SRS in the available slot being configured as flexible symbols by the information, the terminal does not expect to receive scheduling of downlink transmission to be transmitted on the at least one symbol.

8. A base station operating in a wireless communication system, the base station comprising:
at least one transceiver for transmitting and receiving a wireless signal; and
at least one processor for controlling the at least one transceiver,
wherein the at least one processor configured to:
transmit, to a terminal, configuration information related to a sounding reference signal (SRS), wherein the configuration information includes information on a slot offset between triggering downlink control information (DCI) and SRS transmission;
transmit, to the terminal, information related to a slot configuration;
transmit, to the terminal, DCI for triggering transmission of an SRS for one or more SRS resource sets; and
receive, from the terminal, the SRS in each of the one or more SRS resource sets,
wherein the SRS is transmitted in an available slot for SRS transmission determined based on a slot determined by the information on the slot offset, and
wherein based on at least one symbol for transmission of the SRS in the available slot being configured as flexible symbols by the information, scheduling of downlink transmission to be transmitted on the at least one symbol is not performed.

* * * * *